United States Patent
Lutzky et al.

(10) Patent No.: US 9,124,389 B2
(45) Date of Patent: Sep. 1, 2015

(54) ENCODER AND METHOD FOR PREDICTIVELY ENCODING, DECODER AND METHOD FOR DECODING, SYSTEM AND METHOD FOR PREDICTIVELY ENCODING AND DECODING AND PREDICTIVELY ENCODED INFORMATION SIGNAL

(71) Applicants: Fraunhofer-Gesellschaft zur Foerderung der angewandten Forschung e.V., Munich (DE); Technische Universitaet Ilmenau, Ilmenau (DE)

(72) Inventors: Manfred Lutzky, Nuremberg (DE); Gerald Schuller, Erfurt (DE); Michael Schnabel, Ilmenau (DE); Michael Werner, Volkach (DE)

(73) Assignees: Fraunhofer-Gesellschaft zur Foerderung der angewandten Forschung e.V., Munich (DE); Technische Universitaet Ilemnau, Ilmenau (DE)

( * ) Notice: Subject to any disclaimer, the term of this patent is extended or adjusted under 35 U.S.C. 154(b) by 0 days.

(21) Appl. No.: 13/916,874

(22) Filed: Jun. 13, 2013

(65) Prior Publication Data

US 2013/0272369 A1     Oct. 17, 2013

Related U.S. Application Data

(63) Continuation of application No. PCT/EP2011/072776, filed on Dec. 14, 2011.

(30) Foreign Application Priority Data

Dec. 14, 2010 (EP) .................................. 10195000

(51) Int. Cl.
*G10L 19/06* (2013.01)
*H04L 1/00* (2006.01)
(Continued)

(52) U.S. Cl.
CPC ............... *H04L 1/0014* (2013.01); *G10L 19/06* (2013.01); *G10L 19/005* (2013.01); *G10L 19/04* (2013.01)

(58) Field of Classification Search
CPC ........... H04N 21/2383; H04N 21/4382; G10L 19/04; G10L 19/005; G10L 19/06
USPC .......... 375/240, 308; 704/201, 205, 215, 219, 704/222, 223, 230; 370/311, 338
See application file for complete search history.

(56) References Cited

U.S. PATENT DOCUMENTS 5,752,222 A * 5/1998 Nishiguchi et al. ........... 704/201
5,974,374 A * 10/1999 Wake ............................ 704/215
(Continued)

FOREIGN PATENT DOCUMENTS

CN          101004916 A    7/2007
EP          0 573 216 A2    8/1993
(Continued)

OTHER PUBLICATIONS

Yee, Paul et al: "A Dynamic Regularized Radial Basis Function Network for Nonlinear, Nonstationary Time Series Prediction", IEEE Transactions on Signal Processing, IEEE Service Center, New York, NY, US, vol. 47, No. 9, Sep. 1, 1999.*
(Continued)

*Primary Examiner* — Daniel Washburn
*Assistant Examiner* — Eboni Hughes
(74) *Attorney, Agent, or Firm* — Keating & Bennett, LLP

(57) ABSTRACT

An encoder for predictively encoding a signal having a sequence of signal values has a predictor for performing an adaptive prediction in dependence on the signal, and in dependence on one or more weighting values, to obtain predicted signal values, wherein the predictor is configured to reset the weighting values at times which are dependent on the signal, and wherein the predictor is configured to adapt the weighting values to the signal between subsequent resets.

29 Claims, 13 Drawing Sheets

(DETERMINATION OF RESET TIME IN DEPENDENCE ON CURRENT BITRATE RESERVE)

(51) Int. Cl.
*G10L 19/005* (2013.01)
*G10L 19/04* (2013.01)

(56) References Cited

U.S. PATENT DOCUMENTS

| | | | |
|---|---|---|---|
| 7,386,446 | B2 | 6/2008 | Schuller et al. |
| 2004/0133422 | A1 | 7/2004 | Darroudi et al. |
| 2007/0016409 | A1 | 1/2007 | Schuller et al. |
| 2009/0254783 | A1 | 10/2009 | Hirschfeld et al. |
| 2010/0027392 | A1* | 2/2010 | Wu et al. ............ 369/47.53 |

FOREIGN PATENT DOCUMENTS

| | | | |
|---|---|---|---|
| JP | 58-179897 A | 10/1983 | |
| JP | 4-167635 A | 6/1992 | |
| JP | 8-147000 A | 6/1996 | |
| JP | 2007-534229 A | 11/2007 | |
| JP | 2010-87771 A | 4/2010 | |
| WO | 2010/003663 A1 | 1/2010 | |
| WO | 2010/040503 A2 | 4/2010 | |
| WO | WO2010/040503 * | 4/2010 | ............ G10L 19/02 |

OTHER PUBLICATIONS

Wabnik, S.; Schuller, G.; Kraemer, F., "An error robust Ultra Low Delay audio coder using an MA prediction model," Acoustics, Speech and Signal Processing, 2009. ICASSP 2009. IEEE International Conference on, pp. 5-8, Apr. 19-24, 2009.*

Official Communication issued in International Patent Application No. PCT/EP2011/072776, mailed on Feb. 9, 2012.

Wabnik et al., "An Error Robust Ultra Low Delay Audio Coder Using an Ma Prediction Model," IEEE ICASSP, 2009, pp. 5-8.

Wabnik et al., "Packet Loss Concealment in Predictive Audio Coding," IEEE Workshop on Applications of Signal Processing to Audio and Acoustics, Oct. 16-19, 2005, 4 pages.

Makhoul, "Linear Prediction: A Tutorial Review," Proceedings of the IEEE, vol. 63, No. 4, Apr. 1975, pp. 561-580.

Cuperman et al., "Backward Adaption for Low Delay Vector Excitation Coding of Speech at 16 Kbit/s," IEEE, Nov. 27, 1989, pp. 1242-1246.

Yee et al., "A Dynamic Regularized Radial Basis Function Network for Nonlinear, Nonstationary Time Series Prediction," IEEE Transactions on Signal Processing, vol. 47, No. 9, Sep. 1999, pp. 2503-2521.

Official Communication issued in corresponding Taiwanese Patent Application No. 100146182, mailed on Feb. 12, 2014.

Official Communication issued in corresponding Chinese Patent Application No. 201180067476.1, mailed on Sep. 3, 2014.

English Translation of Official Communication issued in corresponding Japanese Patent Application No. 2013-543764, mailed on Sep. 2, 2014.

English Translation of Official Communication issued in corresponding Korean Patent Application No. 2013-7018228, mailed on Jun. 12, 2014.

* cited by examiner (ENCODER)

(ENCODER WITH RESETTING IN DEPENDENCE ON CURRENT BITRATE RESERVE)

(ENCODER WITH RESETTING BASED ON SIGNAL ANALYSIS)

(ENCODER WITH RESETTING BASED ON RESIDUAL SIGNAL ANALYSIS)

(ENCODER WITH FILTER STRUCTURE AND $w_i$-PROVIDER)

(DETERMINATION OF RESET TIME IN DEPENDENCE ON CURRENT BITRATE RESERVE)

(DETERMINATION OF RESET TIMES BASED ON SIGNAL ANALYSIS)

(NEGATIVE EFFECT OF PERFORMING RESET WITHIN WELL PREDICTABLE SIGNAL)

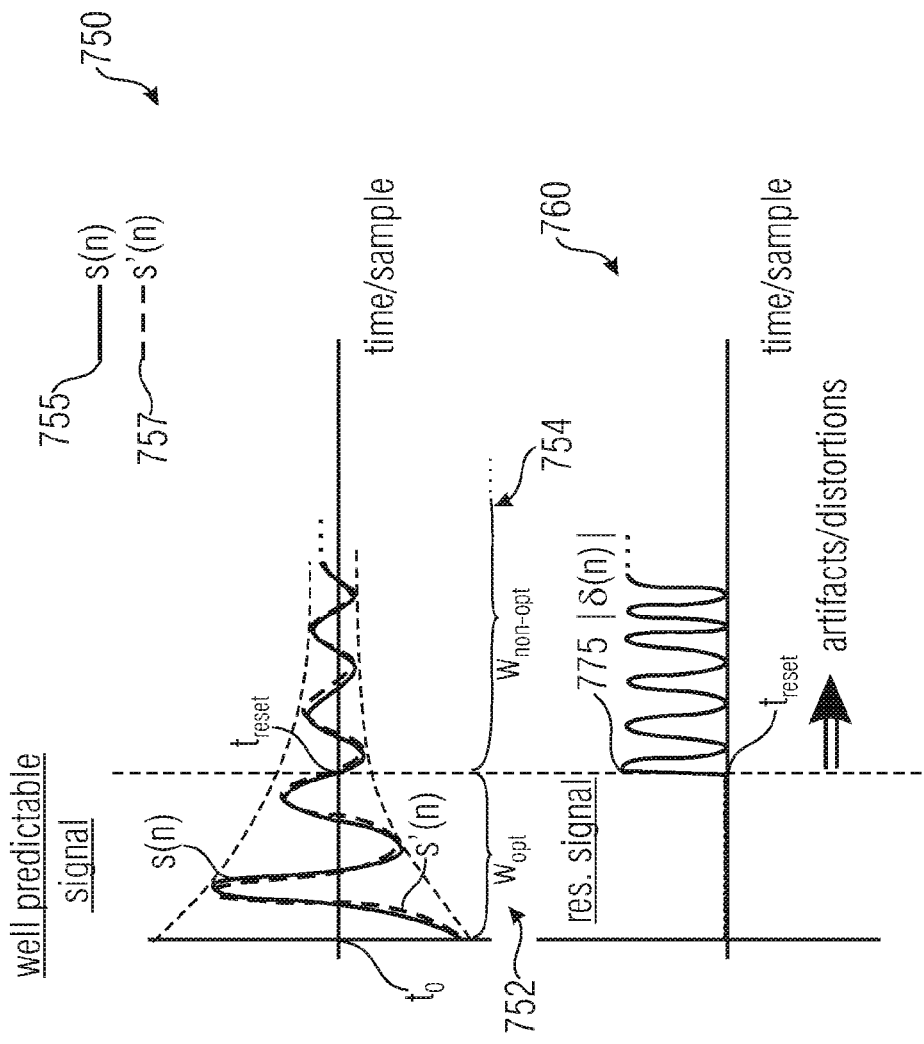

(DECODER FOR DECODING PREDICTIVELY ENCODED SIGNAL USING A RESET INFORMATION)

(DECODER FOR DECODING PREDICTIVELY ENCODED SIGNAL WITH A RESET TIME DETERMINATOR BASED ON A SIGNAL ANALYSIS)

(DECODER FOR DECODING PREDICTIVELY ENCODED SIGNAL WITH A RESET TIME DETERMINATOR USING A CURRENT BITRATE RESERVE)

(ENCODER/DECODER SYSTEM BASED ON ADAPTIVE PREDICTION USING SYNCHRONOUS RESETS)

ENCODER AND METHOD FOR PREDICTIVELY ENCODING, DECODER AND METHOD FOR DECODING, SYSTEM AND METHOD FOR PREDICTIVELY ENCODING AND DECODING AND PREDICTIVELY ENCODED INFORMATION SIGNAL

CROSS-REFERENCE TO RELATED APPLICATIONS

This application is a continuation of copending International Application No. PCT/EP2011/072776, filed Dec. 14, 2011, which is incorporated herein by reference in its entirety, and additionally claims priority from European Application No. 10195000.4, filed Dec. 14, 2010, which is also incorporated herein by reference in its entirety.

BACKGROUND OF THE INVENTION

The present invention generally relates to predictive coding of information signals, and in particular, to an encoder and a method for predictively encoding a signal, to a decoder and a method for decoding a predictively encoded signal, to a system and a method for predictively encoding a signal and for decoding a predictively encoded version of the signal and to a predictively encoded information signal. Further embodiments of the present invention relate to a predictive coding scheme with variable reset times.

A predictive encoder (transmitter) encodes signals by predicting a current value of the signal to be encoded using the previous or preceding values of the signal. This prediction or presumption is sometimes accomplished by a weighted sum of the previous values of the signal. The prediction weights or prediction coefficients are adjusted so that the difference between the predicted signal and the actual signal is minimized in a predetermined manner. The prediction coefficients, for example, are optimized with regard to the square of the prediction error. Only the differences between the predicted values and the actual values of the signal are transmitted to the decoder or receiver. These values are also referred to as residuals or prediction errors. The actual signal value can be reconstructed in the receiver by using the same predictor (for example, identical to the predictor used in the encoder) and by adding the predicted value obtained in the same manner as in the encoder to the prediction error transmitted by the encoder.

In the case of transmitting errors, i.e. if incorrectly transmitted prediction differences or errors occur, prediction will no longer be the same on the transmitter and receiver sides. Incorrect values of the decoded signal will be reconstructed due to the incorrectly transmitted prediction errors on the receiver side.

In order to obtain resynchronization or adjustment between transmitter and receiver, the prediction weights are reset to a predefined state on the transmitter and receiver sides at times equal for both sides, a process also referred to as reset.

In U.S. Pat. No. 7,386,446 B2, it is described that if an adaptive prediction algorithm controllable by a speed coefficient is started from to operate with a first adaption speed and a first adaption precision and an accompanying first prediction precision in the case that the speed coefficient has a first value and to operate with a second, compared to the first one, lower adaption speed and a second, but compared to the first one, higher precision in the case that the speed parameter has a second value, the adaption durations occurring after the reset times where the prediction errors are at first increased due to the, not yet, adapted prediction coefficients may be decreased by at first setting the speed parameter to the first value and, after a while, to a second value. After the speed parameter has again been set to the second value after a predetermined duration after the reset times, the prediction errors and thus the residuals to be transmitted are more optimized or smaller than would be possible with the first speed parameter values.

In S. Wabnik, G. Schuller, F. Kraemer: "An Error Robust Ultra Low Delay Audio Coder Using an MA Prediction Model", ICASSP 2009, Apr. 19-24, 2009, Taipei, Taiwan, two prediction structures for predictive perceptual audio coding in the context of the Ultra Low Delay (ULD) coding scheme are described. One structure is based on the commonly used AR signal model, leading to an IIR predictor in the decoder. The other structure is based on an MA signal model, leading to an FIR predictor in the decoder.

In S. Wabnik, Gerald Schuller, J. Hirschfeld, U. Kraemer: "Packet Loss Concealment in Predictive Audio Coding", 2005 IEEE Workshop on Applications of Signal Processing Audio and Acoustics, Mohonk Mountain House, New Paltz, N.Y., Oct. 16-19, 2005, several concealment strategies for packet losses in the context of a low delay predictive audio coder are described.

In order to facilitate the understanding of predictive coding of information signals, reference is also made to the following documents:

J. Makhoul. Linear Prediction: A Tutorial Review, PROCEEDINGS OF THE IEEE, Vol. 63, NO. 4, April 1975; Ali H. Sayed: "Fundamentals of Adaptive Filtering", Wiley-IEEE Press, 2003; and Simon S. Haykin, "Adaptive Filter Theory", Prentice Hall International, 2001.

However, a general problem of know solutions is that because of such resets, the prediction errors will increase at the reset times. A larger prediction error, in turn, results in an increased necessitated bitrate for transmission. In the case that only a limited bitrate amount is available, such as in 'Constant Bitrate Coding', the signal quality will be reduced (e.g., due to distortions or noise).

Therefore, it is an object of the present invention to provide a predictive encoding and/or decoding scheme which allows for an improved tradeoff between prediction reliability, necessitated bitrate and signal quality.

SUMMARY

According to an embodiment, an encoder for predictively encoding a signal having a sequence of signal values may have: a predictor for performing an adaptive prediction in dependence on the signal, and in dependence on one or more weighting values, to obtain predicted signal values, wherein the predictor is configured to reset the weighting values at times which are dependent on the signal, and wherein the predictor is configured to adapt the weighting values to the signal between subsequent resets; wherein the encoder is configured for obtaining a bitstream representing the signal, and wherein the predictor is configured to perform the resets in dependence on a current bitrate reserve available for providing the bitstream.

According to another embodiment, a decoder for decoding a predictively encoded signal having a sequence of residual signal values encoded within a bitstream may have: a bitstream parser configured for obtaining the residual signal values from the bitstream; a reset time determinator configured to determine reset times in dependence on the residual signal values; and a predictor which is configured to perform an adaptive prediction to obtain predicted signal values and to add the predicted signal values and the residual signal values to obtain decoded signal values, wherein the predictor is configured to reset one or more weighting values for the adaptive prediction at the determined reset times, and wherein the predictor is configured to adapt the weighting values to the signal to be decoded between subsequent resets.

According to another embodiment, a decoder for decoding a predictively encoded signal having a sequence of residual signal values encoded within a bitstream may have: a bitstream parser configured for obtaining the residual signal values from the bitstream; a reset time determinator configured to determine reset times in dependence on a current bitrate reserve of a bitstream representing the predictively encoded signal; and a predictor which is configured to perform an adaptive prediction to obtain predicted signal values and to add the predicted signal values and the residual signal values to obtain decoded signal values, wherein the predictor is configured to reset one or more weighting values for the adaptive prediction at the determined reset times, and wherein the predictor is configured to adapt the weighting values to the signal to be decoded between subsequent resets.

According to another embodiment, a system for predictively encoding a signal having a sequence of signal values and for decoding a predictively encoded version of the signal having a sequence of residual signal values may have: an encoder as mentioned above; and a decoder as mentioned above; wherein the predictors of the encoder and the decoder are configured to perform the resets synchronously.

According to another embodiment, a method for predictively encoding a signal having a sequence of signal values may have the step of: performing an adaptive prediction in dependence on the, and in dependence on one or more weighting values, to obtain predicted signal values, wherein the step of performing an adaptive prediction has resetting the weighting values at times which are dependent on the signal, and adapting the weighting values to the signal between subsequent resets; wherein the method has obtaining a bitstream representing the signal, and wherein the resets are performed in dependence on a current bitrate reserve available for providing the bitstream.

According to still another embodiment, a method for decoding a predictively encoded signal having a sequence of residual signal values encoded within a bitstream may have the steps of: obtaining the residual signal values from the bitstream; determining reset time in dependence on the residual signal values; performing an adaptive prediction to obtain predicted signal values and adding the predicted signal values and the residual signal values to obtain decoded signal values, wherein the steps of performing an adaptive prediction and adding have resetting one or more weighting values for the adaptive prediction at the determined reset times, and adapting the weighting values to the signal to be decoded between subsequent resets.

According to another embodiment, a method for decoding a predictively encoded signal having a sequence of residual signal values encoded within a bitstream may have the steps of: obtaining the residual signal values from the bitstream; determining reset times in dependence on a current bitrate reserve of a bitstream representing the predictively encoded signal; and performing an adaptive prediction to obtain predicted signal values and adding the predicted signal values and the residual signal values to obtain decoded signal values, wherein the steps of performing an adaptive prediction and adding have resetting one or more weighting values for the adaptive prediction at the determined reset times, and adapting the weighting values to the signal to be decoded between subsequent resets.

According to another embodiment, a method for predictively encoding a signal having a sequence of signal values and for decoding a predictively encoded version of the signal having a sequence of residual signal values may have: a method for encoding as mentioned above; and a method for decoding as mentioned above; wherein in the step of resetting the one or more weighting values, the resets are performed synchronously.

According to another embodiment, an encoder for predictively encoding a signal having a sequence of signal values may have: a predictor for performing an adaptive prediction in dependence on the signal, and in dependence on one or more weighting values, to obtain predicted signal values, wherein the predictor is configured to reset the weighting values at times which are dependent on the signal, and wherein the predictor is configured to adapt the weighting values to the signal between subsequent resets; wherein the encoder is configured to determine a tonality parameter from the signal values and to selectively perform the resets at times for which the signal is non-tonal in dependence on the determination of the tonality.

According to another embodiment, an encoder for predictively encoding a signal having a sequence of signal values may have: a predictor for performing an adaptive prediction in dependence on the signal, and in dependence on one or more weighting values, to obtain predicted signal values, wherein the predictor is configured to reset the weighting values at times which are dependent on the signal, and wherein the predictor is configured to adapt the weighting values to the signal between subsequent resets; wherein the encoder is configured to perform a residual signal analysis of a residual signal, the residual signal being based on differences between the signal values and the predicted signal values, and to selectively perform the resets in dependence on the residual signal analysis of the residual signal, and wherein the encoder is configured for obtaining a bitstream representing the signal and having a sequence of encoded residual signal values, wherein the encoder is configured to avoid an inclusion of a reset flag indicating a reset of the weighting values into the bitstream.

According to another embodiment, a method for predictively encoding a signal having a sequence of signal values may have the step of: performing an adaptive prediction in dependence on the signal, and in dependence on one or more weighting values, to obtain predicted signal values, wherein the step of performing an adaptive prediction has resetting the weighting values at times which are dependent on the signal, and adapting the weighting values to the signal between subsequent resets; wherein the method has determining a tonality parameter from the signal values and wherein the resets are selectively performed at times for which the signal is non-tonal in dependence on the determination of the tonality.

According to another embodiment, a method for predictively encoding a signal having a sequence of signal values may have the step of: performing an adaptive prediction in dependence on the signal, and in dependence on one or more weighting values, to obtain predicted signal values, wherein the step of performing an adaptive prediction has resetting the weighting values at times which are dependent on the signal, and adapting the weighting values to the signal between subsequent resets; wherein the method has performing a residual signal analysis of a residual signal, the residual signal being based on differences between the signal values and the predicted signal values, and wherein the resets are selectively performed in dependence on the residual signal analysis of the residual signal, and a bitstream representing the signal and having a sequence of encoded residual signal values is obtained, wherein an inclusion of a reset flag indicating a reset of the weighting values into the bitstream is avoided.

Another embodiment may have a computer program having a program code for performing the methods for predictively encoding as mentioned above, the methods for decoding as mentioned above or the method for predictively encoding and decoding as mentioned above, when the computer program is executed on a computer.

The basic idea underlying the present invention is that a good prediction performance can be achieved if an adaptive prediction is performed in dependence on the signal and in dependence on one or more weighting values, and if the weighting values are reset at times which are dependent on the signal. In this way, an increase in the prediction error resulting from a reset and/or an increase in a bitrate necessitated to encode the prediction error with a desired accuracy, can be prevented or at least reduced, thereby allowing to better maintain the signal quality. Alternatively, or in addition, it is possible to choose the reset time such that it is possible to encode even a comparatively large prediction error with good accuracy under given bitrate constraints.

According to further embodiments, the predictor is configured to perform the resets of the weighting values at times which are adapted to the signal.

In addition, the encoder may be configured to selectively choose the reset times for resetting the weighting values. This essentially allows that a perceivability of distortions caused by the resets at the chosen reset times will be smaller than the perceivability of distortions which would be caused by resetting the weighting values at different times.

According to further embodiments, the encoder is configured to generate a residual signal based on differences between the signal values and the predicted signal values. As a result, a provided bitstream may comprise encoded residual signal values, encoded with a variable bitrate. In addition, the predictor may be configured to perform the resets of the weighting values at variable times. In this way, it can be assured that the resets will be performed at times at which there is a bitrate reserve which is larger than or equal to a predetermined bitrate reserve level. Consequently, it is possible to encode the residual signal values with a comparatively high accuracy making use of the available bitrate reserve. Accordingly, audible distortions can be kept small.

Further embodiments of the present invention provide decoders for decoding a predictively encoded signal having a sequence of residual signal values.

According to a further embodiment of the present invention, a system for predictively encoding a signal having a sequence of signal values and for decoding a predictively encoded version of the signal having a sequence of residual signal values is provided.

Further embodiments of the present invention provide methods for predictively encoding a signal and for decoding a predictively encoded version of the signal.

BRIEF DESCRIPTION OF THE DRAWINGS

In the following, embodiments of the present invention will be explained with reference to the accompanying drawings, in which:

FIG. 7b illustrates a negative effect of performing a reset within a further exemplary well predictable signal;

DETAILED DESCRIPTION OF THE INVENTION

Figure 1:
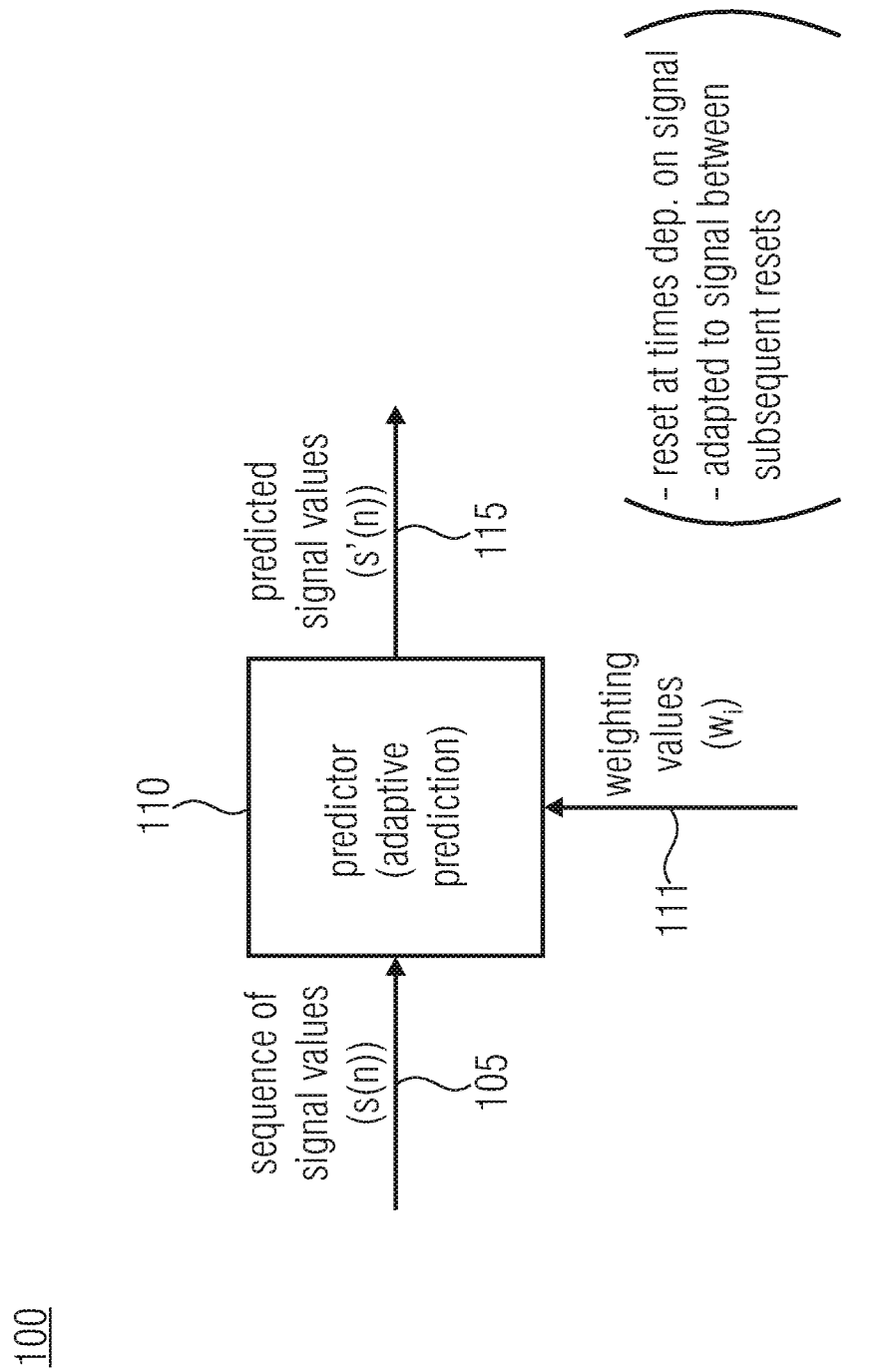
FIG. 1 shows a block diagram of an embodiment of an encoder for predictively encoding a signal.

FIG. 1 shows a block diagram of an embodiment of an encoder 100 for predictively encoding a signal 105. The signal 105 may, for example, be an information signal, such as an audio signal or a video signal, which consists of a sequence of signal values s(n), n=1, 2, 3, . . . , such as audio or video signal values. As shown in FIG. 1, the encoder 100 comprises a predictor 110. The predictor 110 is configured for performing an adaptive prediction in dependence on the signal 105, s(n), and in dependence on one or more weighting values 111, $\omega_i$, to obtain predicted signal values 115, s'(n). In particular, the predictor 110 is configured to reset the weighting values 111 at times which are dependent on the signal 105. Moreover, the predictor 110 is configured to adapt the weighting values 111 to the signal 105 between subsequent resets.

In embodiments, the predictor 110 is configured to perform the prediction by determining a predicted signal value s'(n) from one or more previous signal values s(n−m), m=1, 2, 3, . . . , n−1, for a current signal value s(n). Here, the predicted signal value s'(n) is obtained by a weighted sum of the one or more previous values s(n−m) of the signal.

In embodiments, the weighting values may be adapted such that the prediction error will be kept comparatively small. For example, the weighting values may be adapted such that the predictor will take into account a periodicity or periodic signal portions, respectively. For changes of the signal, e.g. when the signal is non-stationary, the prediction error at first increases, which leads to the consequence that the weighting values will be adapted such that the prediction performed by the predictor will again be adapted to the changed signal. The prediction error then again decreases, provided that the signal now reaches, at least temporarily, a stationary state.

According to further embodiments, the predictor 110 of the encoder 100 may be configured to perform the resets of the weighting values 111 at times which are adapted to the signal 105. In particular, the encoder 110 may be configured to selectively choose the reset times for resetting the weighting values 111 such that a perceivability of distortions caused by the resets of the chosen reset times will be smaller than the perceivability of distortions which would be caused by resetting the weighting values 111 at different times.

Figure 2:
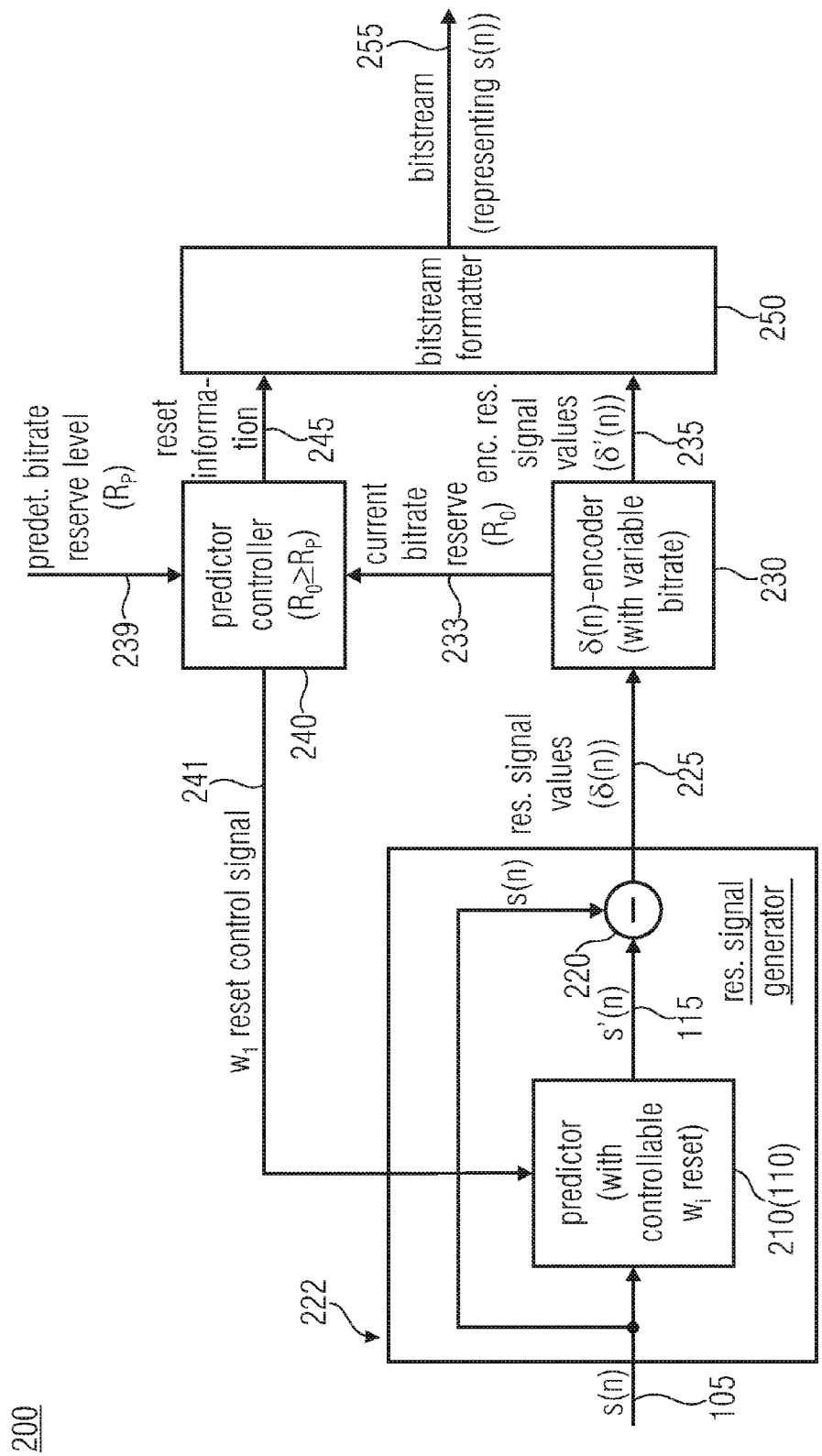
FIG. 2 shows a block diagram of a further embodiment of an encoder for predictively encoding a signal with resetting the weighting values in dependence on a current bitrate reserve.

FIG. 2 shows a block diagram of a further embodiment of an encoder 200 for predictively encoding a signal 105 with a resetting of the weighting values $\omega_i$ in dependence on a current bitrate reserve $R_0$. The encoder 200 of FIG. 2 essentially comprises the predictor 210, which may correspond to the predictor 110 of the encoder 100 shown in FIG. 1. In the embodiment of FIG. 2, the predictor 210 is configured to be operative on the signal 105 and to provide the predicted signal 115 at its output. Here, the predictor 210 may be controllable by a control signal so as to perform a resetting of the weighting values $\omega_i$ in a controllable way. Therefore, in FIG. 2, the processing block 210 is indicated by "predictor with controllable $\omega_i$ reset". In the FIG. 2 embodiment, the subtractor 220 is placed after the predictor 210, wherein the subtractor 220 is configured to subtract the predicted values 115 s'(n) from the signal values 105, s(n) so that residual signal values $\delta(n)$ are obtained at the output 225 of the subtractor 220. The predictor 210 and the subtractor 220 may therefore constitute a residual signal generator 222 which is configured to determine the residual signal values 225 from an input signal 105. As depicted in FIG. 2, the encoder 200 may also comprise a $\delta(n)$-encoder 230 for encoding the residual signal values 225, $\delta(n)$ to obtain encoded residual signal values 235, $\delta'(n)$. Here, the $\delta(n)$-encoder 230 may, for example, be configured to use a variable bitrate, meaning that a variable number of bits per sample of the residual signal can be employed by the $\delta(n)$-encoder 230 for the encoding process. For example, an increased bitrate can be allocated to a portion of a signal to be encoded essentially corresponding to a relatively high prediction error, while a reduced bitrate can be allocated to a different portion of the signal to be encoded essentially corresponding to a relatively low prediction error. This will be described in more detail below.

It can also be seen in FIG. 2 that the $\delta(n)$-encoder 230 may be configured to provide an indication 233 indicating a current bitrate reserve (or, equivalently, bit reserve) ($R_0$) which is essentially related to an encoding of the residual signal values 225 performed by the $\delta(n)$-encoder 230. The indication 233 indicating the current bitrate reserve (or bit reserve) $R_0$ is received by a predictor controller 240 which may be configured to provide a control signal 241 for the predictor 210 having the controllable $\omega_i$ reset and, optionally, a reset information 245. In particular, the predictor controller 240 may be set so that the control signal 241 (i.e. $\omega_i$ reset control signal) will be based on a comparison of the current bitrate reserve $R_0$ indicated by the indication 233 and a predetermined bitrate reserve level 239 ($R_p$). The comparison performed by the predictor controller 240 may, for example, be such that the predictor 210 will be controlled by the $\omega_i$ reset control signal 241 so as to perform a resetting of the weighting values for the adaptive prediction when the current bitrate reserve $R_0$ exceeds, or is equal to, the predetermined bitrate reserve level ($R_0 \geq R_p$). In this case, it can essentially be ensured that a sufficiently high bitrate reserve will be available for providing a bitstream to be derived from the input signal 105. In particular, it will be ensured that the residual signal, which typically takes comparatively large values shortly after a reset, can be encoded with good accuracy due to the availability of a sufficiently large bitrate reserve.

Referring to the FIG. 2 embodiment, the encoder 200 may also comprise a bitstream formatter 250. In particular, the bitstream formatter 250 may be configured to format the encoded residual signal values 235 and the reset information 245, to obtain a bitstream 255. Here, the bitstream 255 essentially represents the signal 105, s(n) and can be used for storage or transmission of the same.

Therefore, in the embodiment of FIG. 2, the encoder 200 is essentially configured for obtaining a bitstream 255 representing the signal 105, wherein the predictor 210 is configured to perform the resets in dependence on a current bitrate reserve 233 $R_0$ available for providing the bitstream 255. Moreover, the residual signal generator 222 of the encoder 200 as shown in FIG. 2 is configured to generate the residual signal $\delta(n)$ based on differences between the signal values 105 and the predicted signal values 115, so that the bitstream 255 comprises encoded residual signal values 235, encoded with a variable bitrate (or number of bits per value of the residual signal). Essentially, the predictor 210 of the encoder 200 is configured to perform the resets of the weighting values at variable times, such that the resets will be performed at times at which there is a bitrate reserve 233 which is larger than or equal to a predetermined bitrate reserve level 239.

Figure 3A:
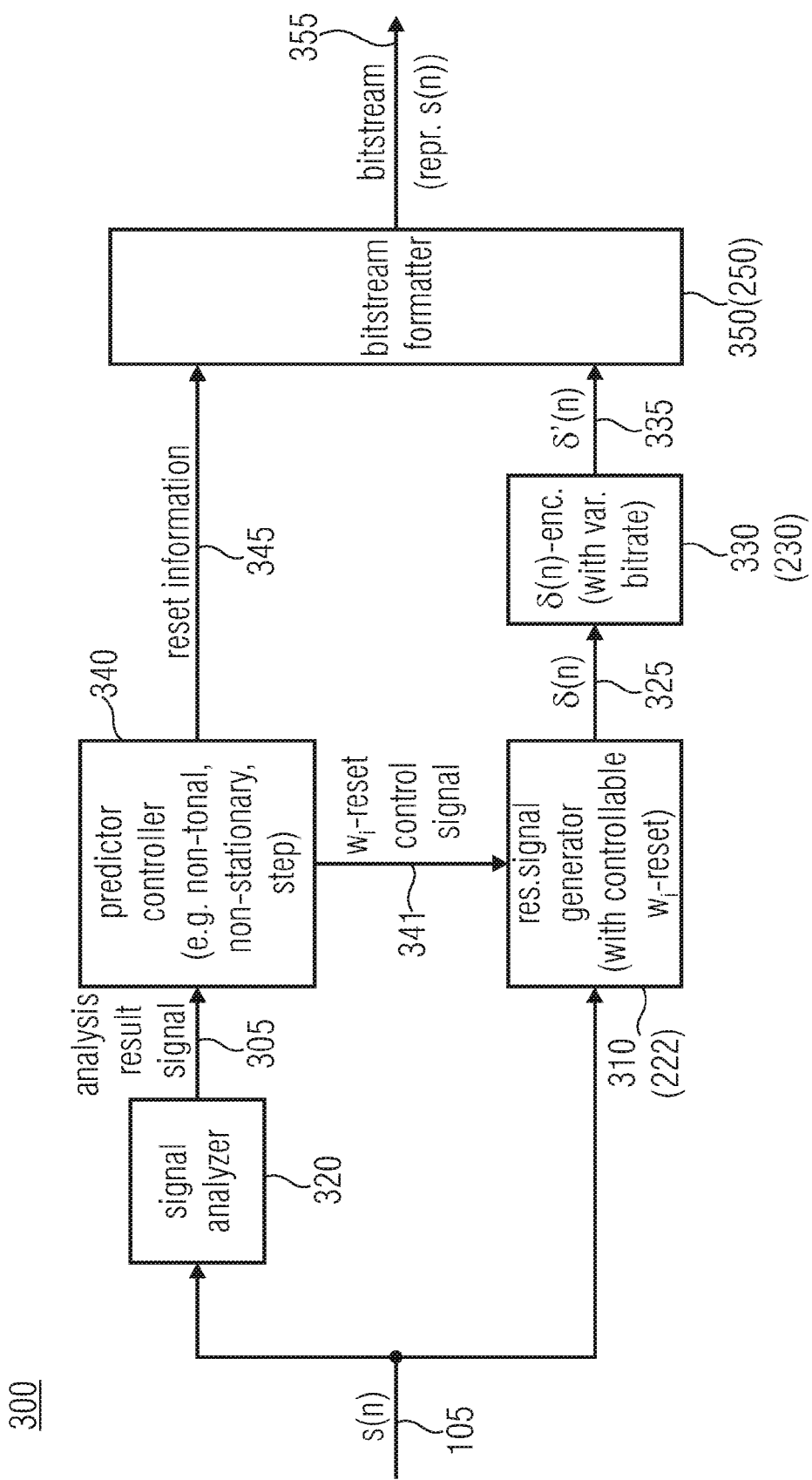
FIG. 3a shows a block diagram of a further embodiment of an encoder for predictively encoding a signal with resetting the weighting values based on a signal analysis.

FIG. 3a shows a block diagram of a further embodiment of an encoder 300 for predictively encoding a signal 105 with resetting the weighting values ($\omega_i$) based on a signal analysis. As shown in FIG. 3a, the encoder 300 may comprise a residual signal generator 310, a $\delta(n)$-encoder 330 and a bitstream formatter 350. Here, the processing blocks 310, 330, 350 of the encoder 300 shown in FIG. 3a essentially correspond to the processing blocks 222, 230, 250 of the encoder 200 shown in FIG. 2. In particular, the residual signal generator 310 having a controllable $\omega_i$-reset may be configured to obtain residual signal values 325 $\delta(n)$ from the signal values 105, s(n), such that a residual signal is provided, which is defined by the residual signal values 325, $\delta(n)$, and which is dependent on the signal 105, s(n). Moreover, the $\delta(n)$-encoder 330 may be configured to encode the residual signal values 325, $\delta(n)$ to obtain encoded residual signal values 335, $\delta'(n)$, such as by employing a variable bitrate which has been described before.

In the embodiment of FIG. 3a, the encoder 300 may also comprise a signal analyzer 320, which may be implemented for analyzing the signal 105 to obtain an analysis result signal 305. Here, the signal analysis performed by the signal analyzer 320 can, for example, be used to determine signal characteristics of the signal 105 which are described by the analysis result signal 305, which can subsequently be used as a basis for a control of an $\omega_i$-reset operation performed within the residual signal generator 310. Specifically, the signal analyzer 320 of the encoder 300 may be configured to derive the signal characteristics of the signal 105 based on a determination of a tonality parameter, a transient behavior and/or a discontinuity behavior from the signal values s(n), to obtain the analysis result signal.

In embodiments, the signal analyzer 320 may be configured to obtain the signal characteristics, which are described by the analysis result signal 305, by determining whether an analysis region (for example, a given time interval) of the signal 105 includes a transient event or is non-stationary, i.e. whether the analysis region is characterized by a relatively sudden change in energy of the signal 105 in time, such as an increase or decrease in energy by more than e.g. 50% from one temporal portion to the next temporal portion of the analysis region. Here, the transient detection can, for example, be based on a measure of the power contained in a high-frequency band of the signal 105 and a subsequent comparison of a temporal change in power with a predetermined threshold.

In further embodiments, the signal analyzer 320 may be configured to determine the signal characteristics by calculating a tonality parameter from the signal 105, wherein the tonality parameter essentially indicates how the spectral energy is distributed in one or more frequency bands. In the case that the spectral energy is distributed relatively uniformly in a band, a rather non-tonal signal exists in this band, while in the case that the spectral energy is relatively strongly concentrated at a specific location in this band, a rather tonal signal exists for this band.

According to further embodiments, the signal analyzer 320 may be configured to determine the signal characteristics by verifying whether there is a step or discontinuity in the signal shape or signal envelope in the form of a sudden or abrupt change between subsequent signal values or adjacent temporal portions.

As shown in FIG. 3a, a predictor controller 340 is placed after the signal analyzer 320, which can especially be set to provide an $\omega_i$-reset control signal 341 for the residual signal generator 310 based on the signal characteristics of the signal 105 which are described by the analysis result signal. The predictor controller 340 may, for example, be set to control the residual signal generator 310 or its internal predictor by the $\omega_i$-reset control signal 341, such that the resets of the weighting values $\omega_i$ will selectively be performed at times for which the signal has a certain characteristics (for example, at reset times at which, or in an environment of which, the signal is, for example, non-tonal, non-stationary, or comprises a step). Besides providing the $\omega_i$-reset control signal 341, the predictor controller 340 may also provide the reset information 345 in dependence on the signal characteristics of the signal 105. The bitstream formatter 350 is configured to format the encoded residual signal values 335 and the reset information 345 provided by the predictor controller 340, to obtain a bitstream 355 representing the signal s(n).

Therefore, with reference to FIG. 3a, the encoder may be configured to perform a signal analysis of the signal s(n) and to selectively perform the resets in dependence on the signal analysis of the signal. Moreover, the encoder may be configured for obtaining a bitstream representing the signal and for providing a reset information encoded within the bitstream in dependence on the signal analysis.

Specific to the embodiment of FIG. 3a is that by selectively performing the resets at selected reset times in dependence on the determination of the signal characteristics, as has been described above, negative effects on the perceived quality which may arise from performing the resets during portions of the signal not being, for example, non-tonal, non-stationary or not comprising a step (discontinuity), can essentially be prevented or reduced.

Figure 3B:
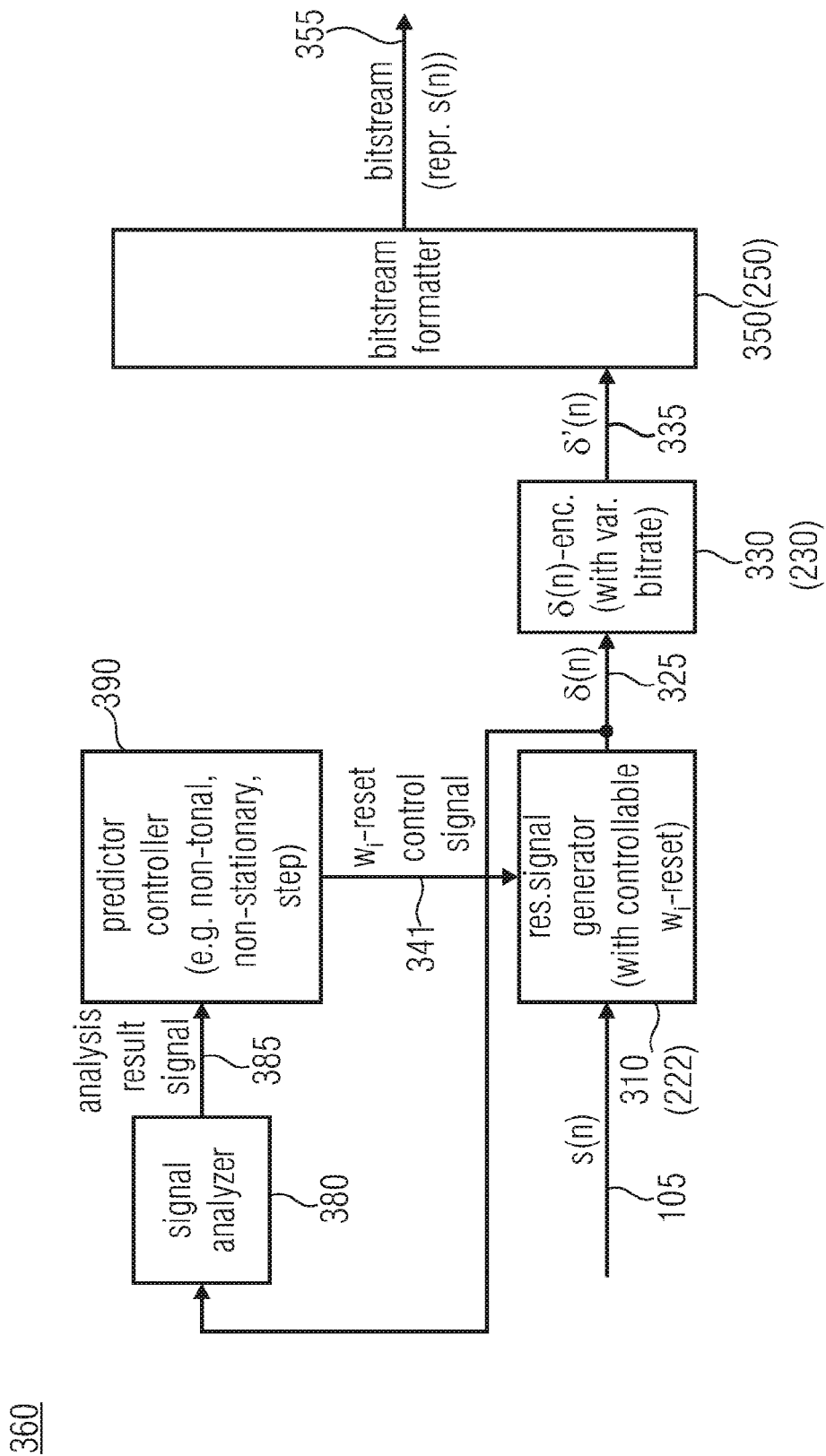
FIG. 3b shows a block diagram of a further embodiment of an encoder for predictively encoding a signal with resetting the weighting values based on a residual signal analysis.

FIG. 3b shows a block diagram of a further embodiment of an encoder 360 for predictively encoding a signal 105 with resetting the weighting values ($\omega_i$) based on a residual signal analysis. Here, the encoder 360 of FIG. 3b essentially comprises the same processing block as the encoder 300 of FIG. 3a. Therefore, identical blocks having similar implementations and/or functions are denoted by the same numerals and a repeated description of the corresponding processing blocks is omitted. However, specific to the encoder 360 of FIG. 3b is that the signal analyzer 380 may be implemented for analyzing the residual signal 325, $\delta(n)$, to obtain an analysis result signal 385. Here, the signal analysis performed by the signal analyzer 380 can, for example, be used to determine signal characteristics of the residual signal 325 which are described by the analysis result signal 385, which can subsequently be used as a basis for a control of an $\omega_i$-reset operation performed within the residual signal generator 310. Specifically, the signal analyzer 380 of the encoder 360 may be configured to derive the signal characteristics of the residual signal 325 based on a determination of some analysis parameters from the residual signal values $\delta(n)$, to obtain the analysis result signal.

As opposed to the predictor controller 340 of the encoder 300 in FIG. 3a, the predictor controller 390 of the encoder 360 in FIG. 3b does not have an output for providing a reset information. Thus, the bitstream formatter 350 is configured to format the encoded residual signal values 335 only, to obtain a bitstream 355 representing the signal s(n). It is also to be noted here that in the embodiment of FIG. 3b, probably some other analysis parameters can or have to be used which are different from those in the embodiment of FIG. 3a.

Therefore, with reference to FIG. 3b, the encoder may be configured to perform a residual signal analysis of a residual signal $\delta(n)$ and to selectively perform the resets in dependence on the residual signal analysis of the residual signal. Moreover, the encoder may be configured for obtaining a bitstream representing the signal and comprising a sequence of encoded residual signal values $\delta'(n)$. Here, the encoder is configured to avoid an inclusion of a reset flag indicating a reset of the weighting values into the bitstream.

In embodiments, the encoder may be configured to determine a measure of a coding gain from the residual signal $\delta(n)$ and to selectively perform the resets in dependence on the measure of the coding gain. Advantageously, the resets of the weighting values should selectively be performed at times for which the coding gain is relatively small such as when falling below a certain threshold or the residual signal is relatively large such as when exceeding a certain threshold, respectively.

Referring to the embodiments described with reference to FIGS. 1, 2, 3a and 3b, the predictor may therefore be configured to perform the resets at irregular times, which are dependent on the signal.

Figure 4:
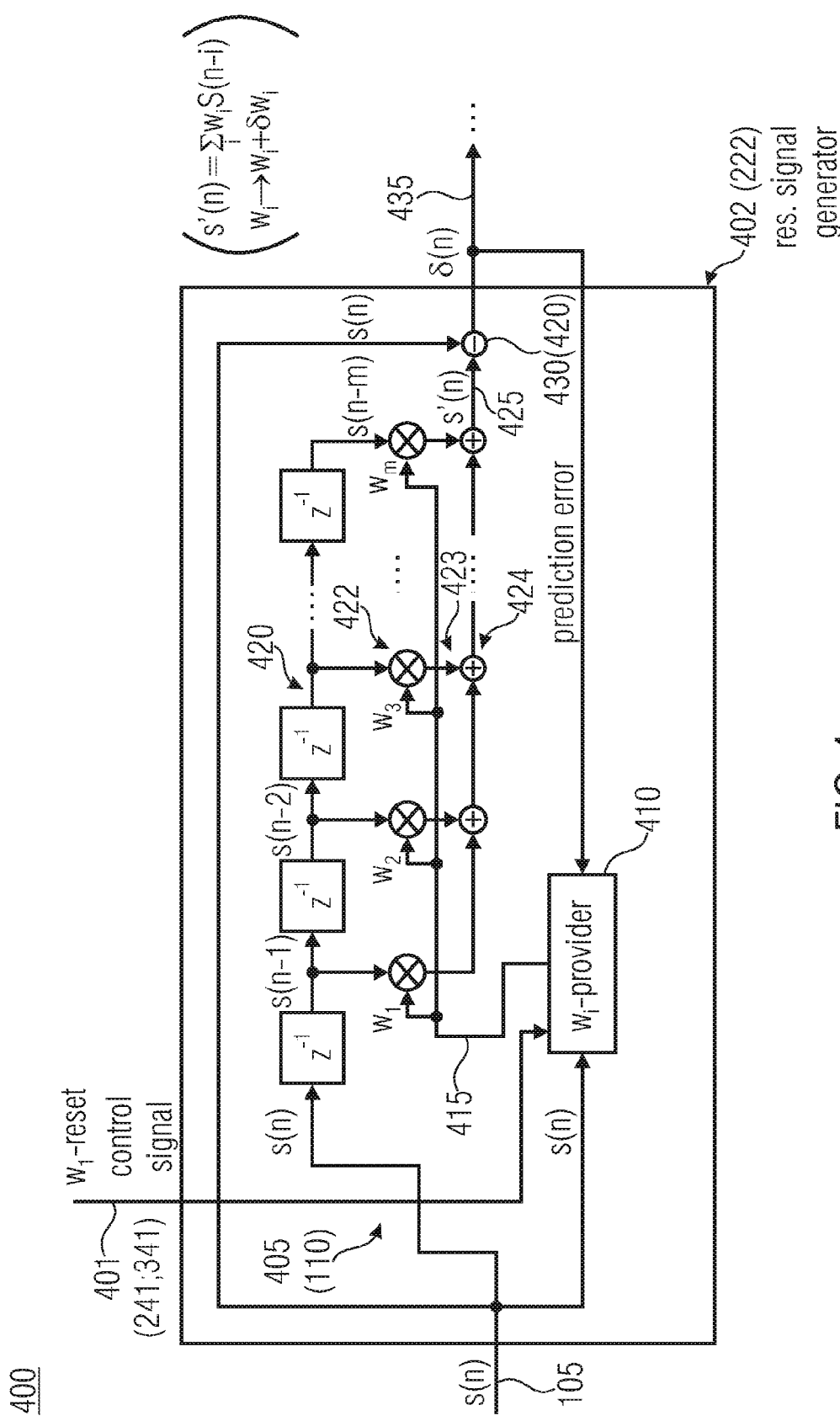
FIG. 4 shows a block diagram of a further embodiment of an encoder for predictively encoding a signal with a filter structure and a provider for providing the weighting values.

FIG. 4 shows a block diagram of a further embodiment of an encoder 400 for predictively encoding a signal 105 with a filter structure 405 and a provider 410 for providing the weighting values. As shown in FIG. 4, the encoder 400 comprises a residual signal generator 402, which includes the filter structure 405 and the $\omega_i$-provider 410. Here, the residual signal generator 402 and the filter structure 405 of the encoder 400 as shown in FIG. 4 may correspond to the residual signal generator 222 and the predictor 110 of the encoder 200 as shown in FIG. 2, respectively. In particular, the filter structure 405 may consists of a plurality 420 of m serially connected delay line elements "$z^{-1}$", which may be configured to successively delay the signal 105, s(n), so that a plurality of successively delayed signal values s(n−1), s(n−2), ..., s(n−m) will be obtained at respective outputs of the plurality 420 of the delay line elements. Subsequently, the plurality of successively delayed signal values s(n−1), s(n−2), ..., s(n−m) will be supplied to a plurality 422 of corresponding multipliers. Each multiplier of the plurality 422 of multipliers may be configured to apply a respective weighting value of a plurality $\omega_i$, i=1, 2, 3, ..., m of weighting values as a filter coefficient or prediction weight to a corresponding signal value s(n−i), i=1, 2, 3, ..., m, so that a plurality 423 of weighted signal values will be obtained at the outputs of the plurality 422 of multipliers. Then, as can be seen in FIG. 4, a plurality 424 of adders may be configured to add the weighted signal values of the plurality 423 of weighted signal values to obtain a predicted signal value s'(n) at an output 425 of the filter structure 405. Here, the predicted signal value s'(n) obtained with the filter structure 405 can be represented by $$s'(n) = \sum_i \omega_i s(n-i).$$

As described correspondingly in the FIG. 2 embodiment, the residual signal generator 402 of the encoder 400 may also comprise a subtractor 430, which may correspond to the subtractor 220 of the encoder 200 shown in FIG. 2. Here, the subtractor 430 may be configured to subtract predicted signal values s'(n) at the output 425 of the filter structure 405 from the signal 105 to obtain residual signal values 435, δ(n) at the output of the residual signal generator 402. The residual signal values 435 may be further processed as in the previous embodiments. It can also be seen in FIG. 4 that the $\omega_i$-provider 410 is especially configured to provide the weighting values 415, $\omega_1, \omega_2, \omega_3, \ldots, \omega_m$ for the respective multipliers of the plurality 422 of multipliers. In particular, the $\omega_i$-provider 410 may provide the weighting values 415 based on a prediction error received from the output 435 of the residual signal generator 402 and it may also receive the signal 105, s(n).

In embodiments, the adaptive prediction can be performed in the following way. First, a plurality of correction values $\delta\omega_i$, i=1, 2, 3, . . . , m, can be calculated for each filter or iteration step, using corresponding values of the signal s(n) and the prediction error δ(n). Then, the thus obtained correction values $\delta\omega_1 \ldots \delta\omega_m$ can be added before the next filter step to the current coefficients $\omega_1 \ldots \omega_m$ to obtain updated weighting values 415, so that the next iteration step for the signal value s(n+1) will be performed with new adapted coefficients $\omega_i \rightarrow \omega_i + \delta\omega_i$. Therefore, the encoder 400 can essentially be used to perform the adaption of the weighting values based on the prediction error.

Referring to the FIG. 4 embodiment, the $\omega_i$-provider 410 of the encoder 400 may be controlled by the $\omega_i$-reset control signal 401, which may correspond to the control signal 241, 341 of the embodiments of FIG. 2, 3a or 3b, respectively, so that the weighting values 415 will be reset at times as indicated by the $\omega_i$-reset control signal 401. In embodiments, the resets may be performed by setting the weighting values 415 to predefined values which may, for example, be the same for subsequent reset times, wherein the weighting values may represent an initial set of prediction coefficients.

Figure 5:
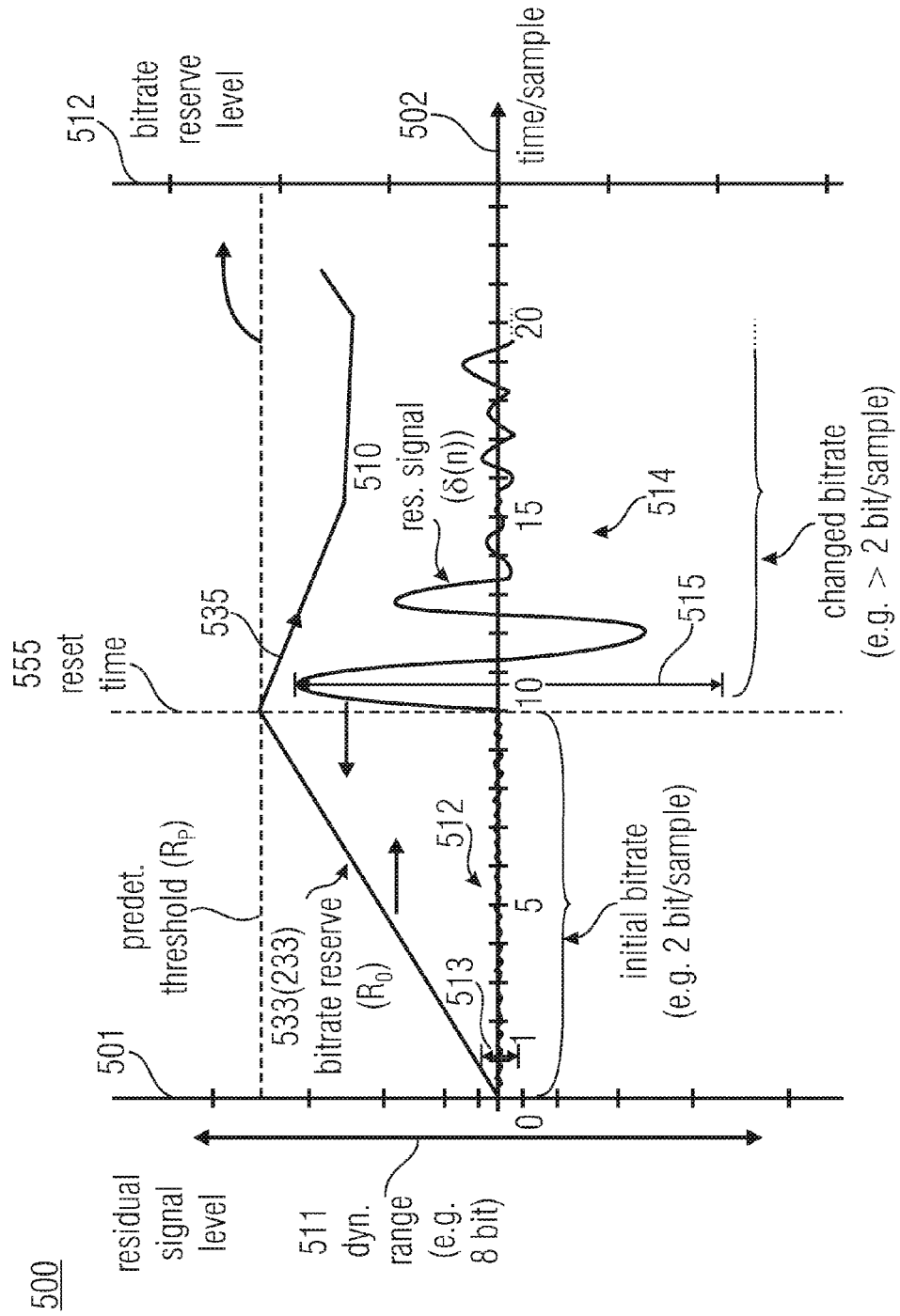
FIG. 5 shows a schematic illustration of a concept for determining a reset time for resetting the weighting values in dependence on a current bitrate reserve according to an embodiment of the present invention.

FIG. 5 shows a schematic illustration 500 of a concept for determining a reset time 555 for resetting the weighting values in dependence on a current bitrate reserve ($R_0$) according to an embodiment of the present invention. In the schematic illustration 500 of FIG. 5, an exemplary residual signal 510 δ(n), which may correspond to the residual signals 225; 325; 435 of FIGS. 2; 3a; 3b; 4, respectively, is shown. Here, the corresponding (left) vertical axis 501 represents a residual signal level while the horizontal axis 502 is the time/sample axis. It can be seen in FIG. 5 that the vertical axis 501 may, for example, represent the signal level using a non-linear scale. As depicted in FIG. 5, the exemplary residual signal 510 may have a typical signal shape, wherein a first portion 512 of the residual signal 510 may be close to or dither around zero, while a second consecutive portion 514 of the residual signal 510 may have a strongly varying signal shape being characterized by a relatively large range between maximum and minimum signal values of the residual signal 510.

According to embodiments, the residual signal 510 may be encoded as described in previous embodiments (see, e.g. FIGS. 2, 3a and 3b). Here, a dynamic range 511 corresponding to a maximally available bitrate, such as, for example, 8 bit per sample, may be used for the encoding.

Referring to FIG. 5, the first signal portion 512 may, for example, be encoded with an initial (average) bitrate of 2 bit/sample, as exemplarily indicated by an arrowed line 513, while the second signal portion 514 may, for example, be encoded with a changed or increased bitrate of more than 2 bit/sample, as exemplarily indicated by the arrowed line 515. Here, the encoding may be performed such that a current bitrate (i.e. the per sample bitrate) will be sufficiently high for each sample of the residual signal 510, without necessitating to scale or reduce the signal level of the same.

In dependence on the level of the residual signal 510 and the actual bitrate used for encoding the same, the current bitrate reserve 533 $R_0$ will be present or available, wherein the change of the current bitrate reserve 533 $R_0$ may be based on a difference between the average available bitrate (e.g. 4 bit/sample) and the actual bitrate (e.g. 2 bit/sample). In FIG. 5, a current bitrate reserve signal 533 is exemplarily shown, which may correspond to the current bitrate reserve 233 $R_0$ of the FIG. 2 embodiment. It is shown in FIG. 5 that the current bitrate reserve signal 533 may be increasing for the first signal portion 512, while it may be decreasing for the second signal portion 514, as indicated by an arrow 535. This behavior of the current bitrate reserve signal 533 may essentially be due to the fact that a smaller or larger bitrate can be used for encoding the first or the second signal portion 512, 514, respectively. The level of the current bitrate reserve signal 533 can be represented by the (right) vertical axis 512 having, for example, a linear scale. According to the schematic illustration of FIG. 5, the reset time 555 for resetting the weighting values of the prediction may be determined checking whether the condition $R_0$ $R_p$ is fulfilled, wherein the reset time 555 essentially corresponds to a time at which a level of the current bitrate reserve $R_0$ is larger than or equal to a predetermined threshold $R_p$. This measure essentially ensures that a large enough bitrate reserve will be available at all times for providing the bitstream, even in case the prediction error is high. In particular, it is ensured that a sufficient bitrate reserve is available shortly after a reset, to be able to encode the residual signal, which typically takes large values shortly after a reset, with good accuracy.

Figure 6:
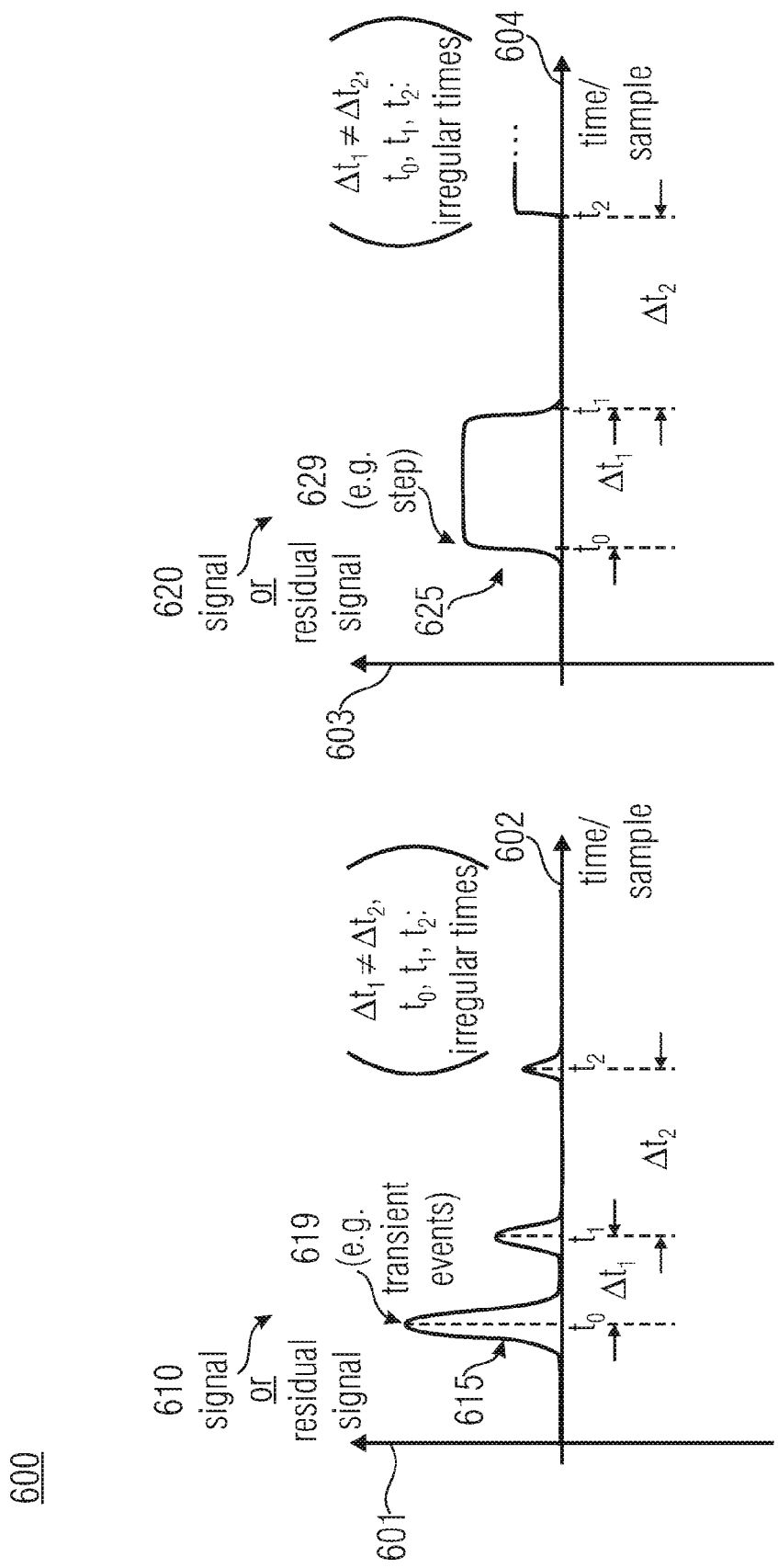
FIG. 6 shows a schematic illustration of a concept for selectively determining reset times for resetting the weighting values based on a signal analysis according to a further embodiment of the present invention.

FIG. 6 shows a schematic illustration 600 of a concept for selectively determining reset times $t_0, t_1, t_2$ for resetting the weighting values based on a signal analysis according to a further embodiment of the present invention. According to the schematic illustration of FIG. 6, the signal analysis may be performed to obtain a plurality of reset times $t_0, t_1, t_2$ from the signal, which may be the signal 105, s(n), or the residual signal 325, δ(n), in the previous embodiments, wherein the reset times $t_0, t_1, t_2$ used for resetting the weighting values of the prediction essentially correspond to specific times obtained from the signal analysis. Here, it is to be noted that these specific times or reset times $t_0, t_1, t_2$ may be irregular, i.e. a first time period $\Delta t_1$ defined by the times $t_0$ and $t_1$ and a second time period $\Delta t_2$ defined by the times $t_1$ and $t_2$ may be different ($\Delta t_1 \neq \Delta t_2$). Therefore, the resets may not have to be performed at predetermined fixed time intervals, but may be performed at irregular times dependent on or adapted to the signal.

As described before, the signal analysis may especially be used to identify characteristic events or conditions within the signal such as non-tonal or non-stationary events or conditions or steps/discontinuities or the like. For illustration, in a first panel 610 of FIG. 6, an example signal or residual signal 615 is shown, which is characterized by a plurality 619 of transient events occurring at the specific times $t_0, t_1, t_2$, while in a second panel 620 an example signal or residual signal 625 is shown, which is characterized by a plurality 629 of steps occurring at these specific times. Here, the vertical axes 601, 603 and the horizontal axes 602, 604 of the first and the second panel 610, 620 correspond to the signal level (or signal) or the time/sample, respectively.

Figure 7A:
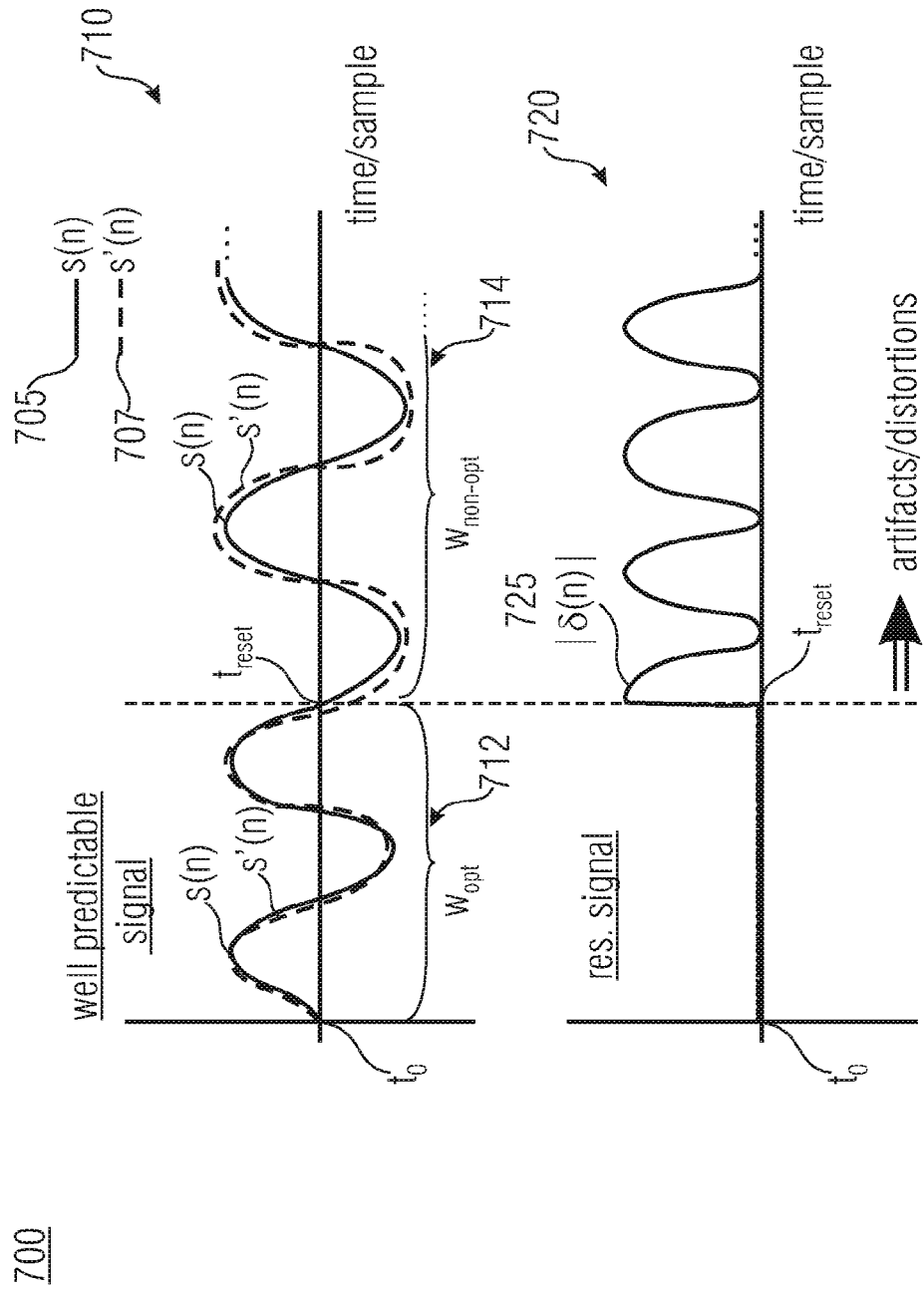
FIG. 7a illustrates a negative effect of performing a reset within an exemplary well predictable signal.

FIG. 7a illustrates a negative effect of performing a reset within an exemplary well predicable signal 705. In a first panel 710 of FIG. 7a, the well predictable signal 705, which is indicated by a continuous line, may be characterized in that it can be well predicted by using an adaptive prediction, such as described previously. Here, the well predictable signal 705 may, for example, be an approximately periodic signal. It is particularly shown in the first panel 710 of FIG. 7a that the signal shape of a predicted signal 707, s'(n) as indicated by a dotted line may approximately fit to that of the original signal 705, s(n) within a first time portion 712, while it may strongly deviate from the original signal within a second time portion 714. Here, the first time portion 712 can be defined by an initial time $t_0$ and a reset time $t_{reset}$, while the second time portion 714 can be defined by the reset time $t_{reset}$ as a starting point. A rather strong deviation between the original signal 705, s(n) and the predicted signal 707, s'(n) during the second time portion 714 may originate from performing a reset of the weighting values at the reset time $t_{reset}$ being located within a well-predicable signal portion. This is because for the first time portion 712, the weighting values ($\omega_{opt}$) may be in an optimized state, while for the second time portion 714, the weighting values ($\omega_{non-opt}$) may be in a non-optimized state, i.e. they are de-adjusted due to the reset operation. The negative effect of this reset operation is illustrated in a second panel 720 of FIG. 7a. In the second panel 720 of FIG. 7a, the residual signal or its magnitude 725, |δ(n)| is shown, which essentially corresponds to the difference between the original signal 705 s(n) and the predicted signal 707, s'(n) shown in the first panel 710 of FIG. 7a. It can be clearly seen that the magnitude 725 of the residual signal nearly diminishes between $t_0$ and $t_{reset}$, while it is characterized by relatively large values starting from the reset time $t_{reset}$. Therefore, because of the abrupt change of the magnitude 725 of the residual signal around the reset time $t_{reset}$, perceivable artifacts/distortions may be introduced, thereby leading to a significant reduction of the signal quality. For example, it may be necessitated to encode the comparatively large residual signal using a low accuracy due to bitrate constraints.

FIG. 7b illustrates this negative effect by the example of a further well predictable signal 755. As shown in a first panel 750 of FIG. 7b, the well predictable signal 755 may be a periodic and steadily decaying signal, which can be well predicted by a predictive signal 757 within a first time portion 752 in which optimized weighting values ($\omega_{opt}$) are available, while it may strongly deviate from the predicted signal 757 within a second time portion 754 in which optimized weighting values ($\omega_{non-opt}$) are not available because default weighting values are used in response to the reset. An exemplary resulting residual signal or its magnitude 775 is depicted in a second panel 760 of FIG. 7b, explicitly showing the abrupt change of the residual signal around the reset time $t_{reset}$. Consequently, in the example of FIG. 7b, perceivable artifacts/distortions will arise leading to a reduction of the signal quality as in the example of FIG. 7a.

Figure 8:
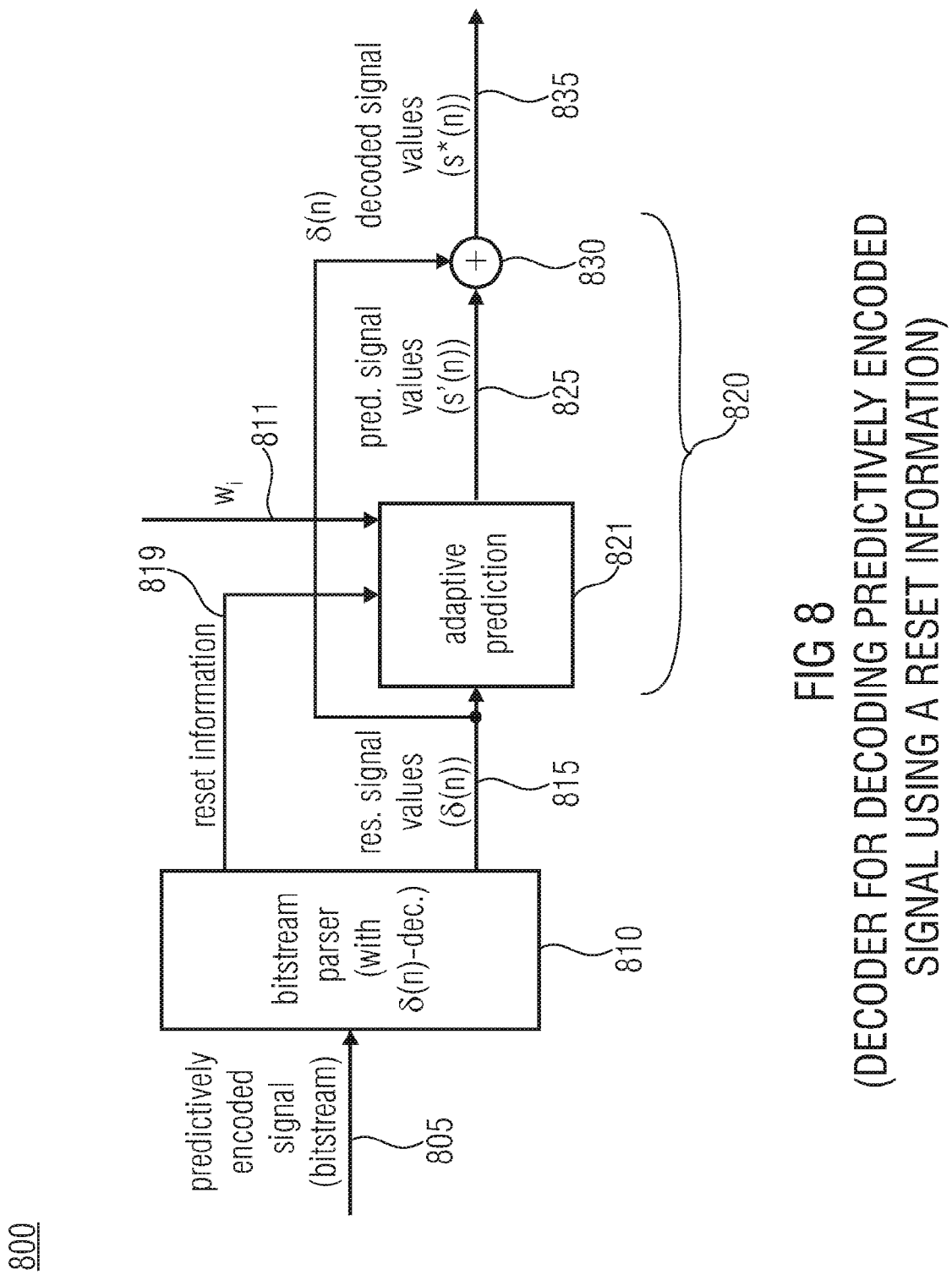
FIG. 8 shows a block diagram of an embodiment of a decoder for decoding a predictively encoded signal using a reset information.

FIG. 8 shows a block diagram of an embodiment of a decoder 800 for decoding a predictively encoded signal 805 using a reset information 819. In the embodiment according to FIG. 8, the predictively encoded signal 805 may comprise a sequence of residual signal values 815, δ(n) and a reset information 819 encoded within a bitstream. Here, it is pointed out that the predictively encoded signal 805 in the form of a bitstream may correspond to a bitstream having been obtained by an encoder according to the previous embodiments, such as the bitstreams 255 or 355 of the encoders 200 or 300, respectively, representing the signal s(n). Referring to the FIG. 8 embodiment, the decoder 800 essentially comprises a bitstream parser 810 and a predictor 820. The bitstream parser 810 may be configured for obtaining the residual signal values 815 δ(n) and the reset information 819 from the bitstream 805. Here, the bitstream parser 810 may also comprise a δ(n)-decoder for decoding encoded residual signal values δ' (n) subsequent to obtaining the encoded residual signal values δ' (n) from the bitstream 805.

Specifically, the predictor 820 may be configured to perform an adaptive prediction (block 821) to obtain predicted signal values 825, s'(n) and to add the predicted signal values 825 s'(n) and the residual signal values 815, δ(n) by using an adding block 830 to obtain decoded signal values 835, s*(n). As shown in FIG. 8, the predictor 820 may be configured to reset one or more weighting values 811, $\omega_i$ for the adaptive prediction using the reset information 819. Moreover, the predictor 820 may be configured to adapt the weighting values to the decoded signal 835, s*(n) between subsequent resets. Essentially, the predictor 820 makes use of the provided reset information 819, which has originally been obtained by an encoder such as described in the previous embodiments, and which has been included into the bitstream 805 by the encoder.

Figure 9:
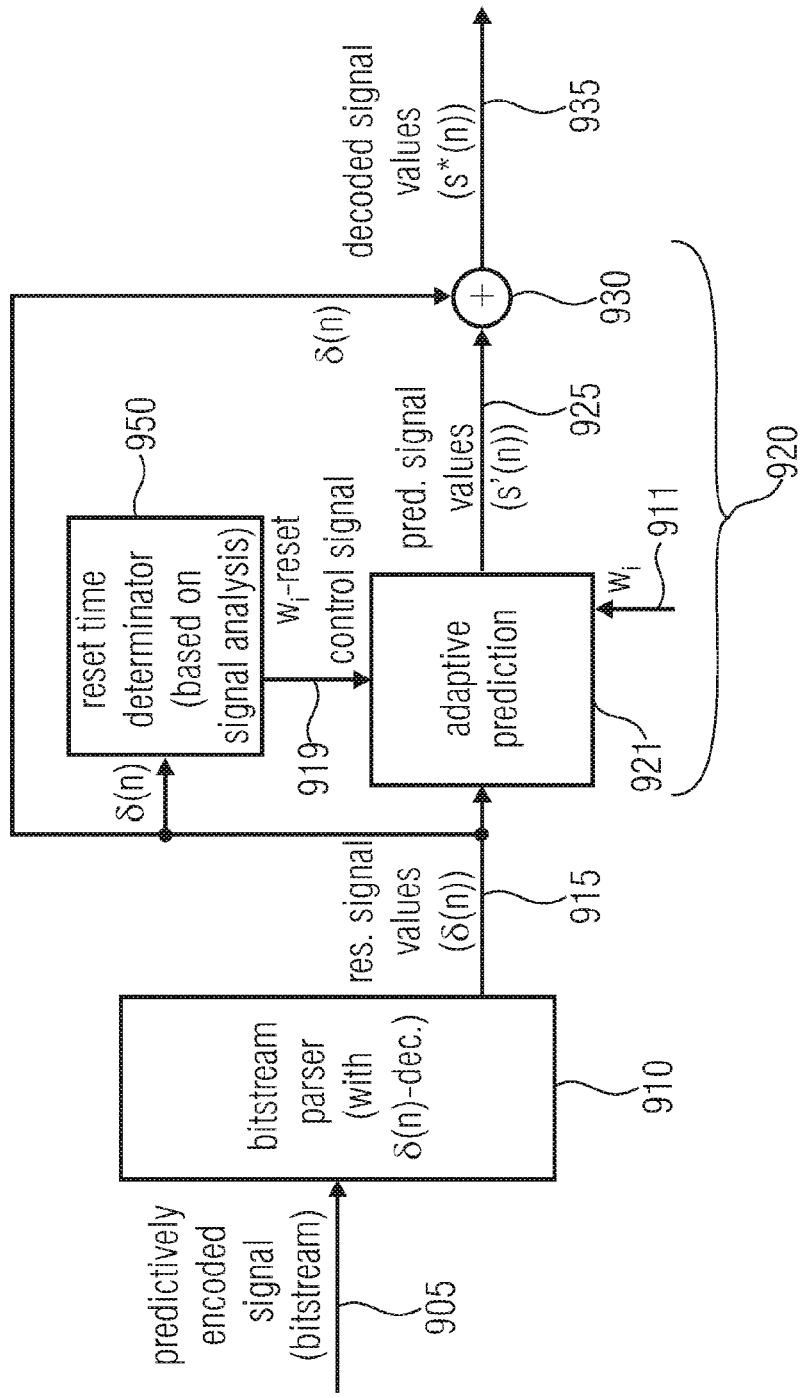
FIG. 9 shows a block diagram of a further embodiment of a decoder for decoding a predictively encoded signal with a reset time determinator based on a signal analysis.

FIG. 9 shows a block diagram of a further embodiment 900 of a decoder for decoding a predictively encoded signal 905 with a reset time determinator 950 based on a signal analysis. The signal 905 may comprise a sequence of residual signal values 915, δ(n) encoded within a bitstream and may be provided by one of the previously described encoders. As shown in FIG. 9, the decoder 900 comprises a bitstream parser including a δ(n)-decoder 910, a predictor 920 and a reset time determinator 950. The bitstream parser 910 may be configured for obtaining the residual signal values 915, δ(n) from the bitstream. In particular, the bitstream parser 910 may extract encoded residual signal values δ'(n) from the bitstream and subsequently decode the encoded residual signal values δ' (n) by use of a δ(n)-decoder to obtain the residual signal values δ(n). Similar to the decoder 800 shown in FIG. 8, the predictor 920 of the decoder 900 shown in FIG. 9 may be configured to perform an adaptive prediction (block 921) to obtain predicted signal values 925, s'(n) and to add the predicted signal values 925 s'(n) and the residual signal values 915, δ(n) to obtain decoded signal values 935, s*(n) by using an adding block 930. Specific to the FIG. 9 embodiment is that the reset time determinator 950 may be configured to determine reset times in dependence on the residual signal values 915, δ(n). In particular, the reset time determinator 950 may be operative on the residual signal values 915 to perform a signal analysis of the same, such that a $\omega_i$-reset control signal 919 will be obtained at the output of the reset time determinator 950. The thus obtained $\omega_i$-reset control signal 919 may be used to control the predictor 920 for performing an adaptive prediction (block 921) in response to the $\omega_i$-reset control signal 919. The signal analysis performed by the reset time determinator 950 can, for example, be based on signal characteristics of the analyzed signal, such as being characterized as non-tonal, non-stationary, or comprising a step. In particular, the predictor 920 of the decoder 900 may be configured to reset one or more weighting values 911, $\omega_i$ for the adaptive prediction at the determined reset times. In addition, the predictor 920 of the decoder 900 may be configured to adapt the weighting values 911 to the decoded signal between subsequent resets.

FIG. 9 shows the decoder with determination of the reset times based on a signal analysis. Here, the analysis should not be performed on the basis of the reconstructed signal but on the basis of the error signal, the latter being referred to as the residual signal. In other words, the signal analysis is to be performed on the basis of the error signal only.

If, however, the reset time determinator 950 were configured to perform a signal analysis of the decoded signal values 935, this would lead to asynchronous resets in the case of transmitting errors, which could most probably not be synchronized again.

Figure 10:
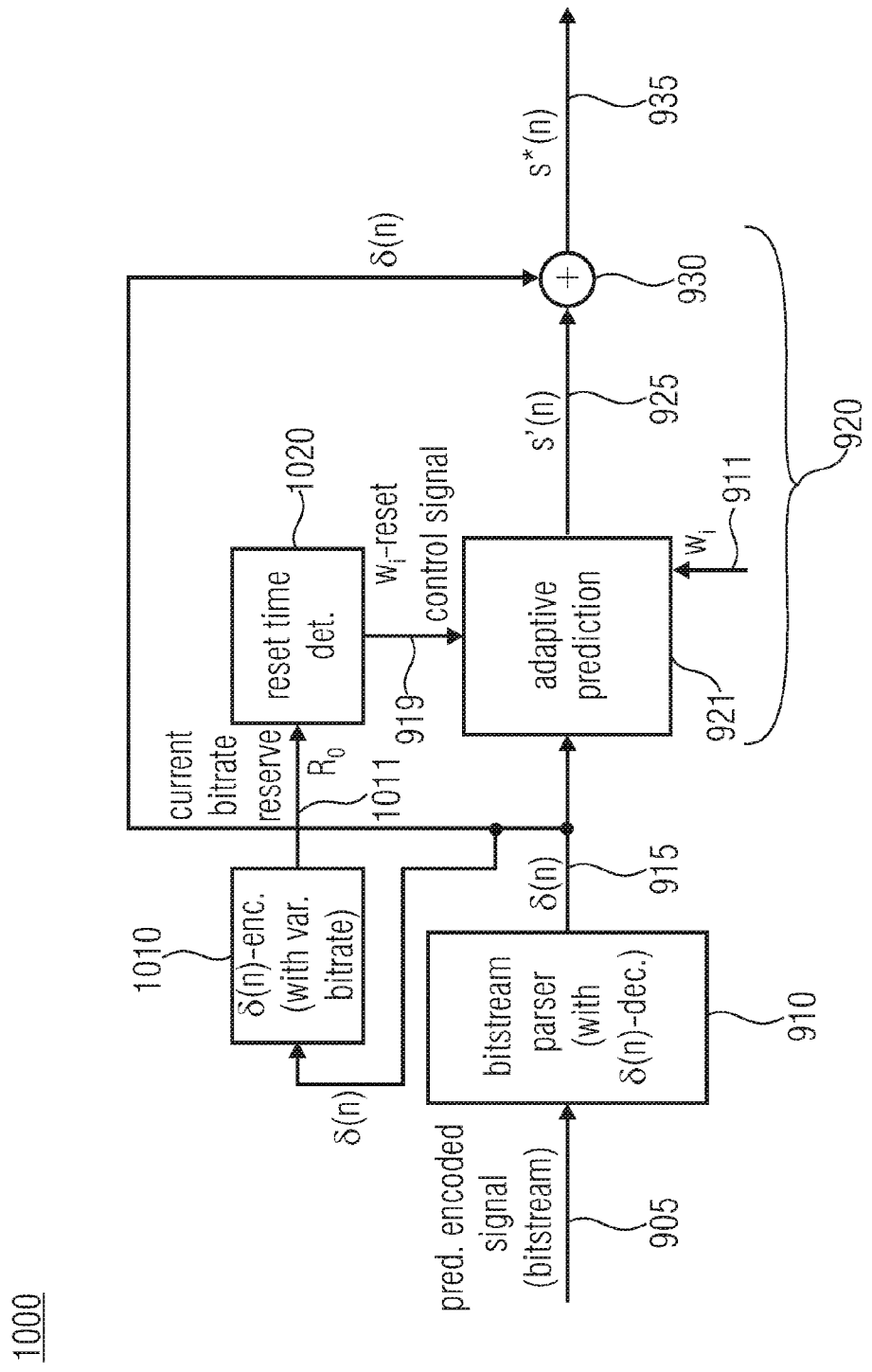
FIG. 10 shows a block diagram of a further embodiment of a decoder for decoding a predictively encoded signal with a reset time determinator using a current bitrate reserve.

FIG. 10 shows a block diagram of a further embodiment of a decoder 1000 for decoding a predictively encoded signal 905 with a reset time determinator 1020 using (or evaluating) a current bitrate reserve 1011, $R_0$. Here, the decoder 1000 of FIG. 10 essentially comprises the same processing block as the decoder 900 of FIG. 9. Therefore, identical blocks having similar implementations and/or functions are denoted by the same numerals and a repeated description of the corresponding processing blocks is omitted. However, specific to the decoder 1000 of FIG. 10 is that the reset time determinator 1020 may be configured to determine reset times in dependence on a current bitrate reserve 1011, $R_0$ of a bitstream representing the predictively encoded signal 905. In particular, the decoder 1000 may comprise a $\delta(n)$-encoder for encoding residual signal values 915, $\delta(n)$ provided by the bitstream parser 910 using a variable bitrate. As a result, a current bitrate reserve indication 1011 will be obtained. Here, the processing performed by the $\delta(n)$-encoder 1010 in the FIG. 10 embodiment may correspond to (or be inverse to) the processing performed by the $\delta(n)$-encoder 230 of the encoder 200 in the FIG. 2 embodiment. The predictor 920 in the FIG. 10 embodiment works as in the FIG. 9 embodiment to finally obtained decoded signal values 935.

Figure 11:
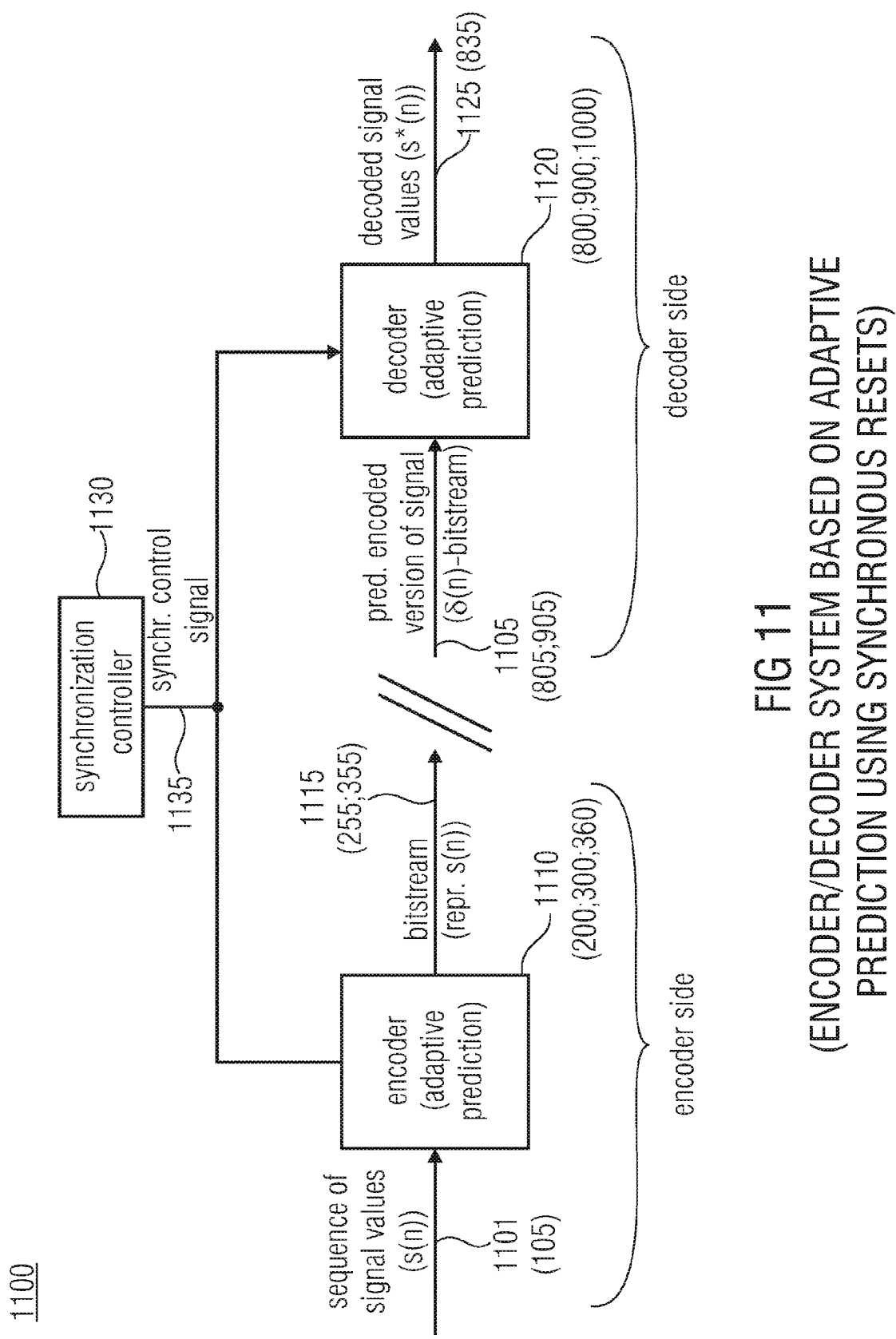
FIG. 11 shows a block diagram of an embodiment of an encoder/decoder system based on an adaptive prediction using synchronous resets.

FIG. 11 shows a block diagram of an embodiment of an encoder/decoder system 1100 based on an adaptive prediction using synchronous resets. On the decoder side of the encoder/decoder system 1100, a decoder 1120 is shown, which may correspond to the decoders 800; 900; 1000 of FIGS. 8; 9; 10, respectively. Therefore, a repeated description of the decoder 1120 of FIG. 11 is omitted here. Basically, the decoder 1120 of FIG. 11 may be operative on a predictively encoded version of the signal 1105 having a sequence of residual signal values $\delta(n)$ encoded within a bitstream to perform an adaptive prediction, so that decoded signal values 1125, s*(n) will be obtained. Here, the predictively encoded version of the signal 1105 and the decoded signal values 1125 may correspond to the predictively encoded signal 805, 905 or the decoded signal values 835; 935 of FIGS. 8; 9; 10, respectively. On the encoder side of the encoder/decoder system 1100, an encoder 1110 is shown, which may correspond to the encoders 200; 300; 360 of FIGS. 2; 3a; 3b, respectively. Therefore, a repeated description of the encoder 110 of FIG. 11 is omitted here. Basically, the encoder 1110 of FIG. 11 may be configured to be operative on a sequence of signal values 1101, s(n) to perform an adaptive prediction, so that a bitstream 1115 representing the signal s(n) will be obtained. Here, the sequence of signal values 1101 and the bitstream 1115 of FIG. 11 may correspond to the signal 105 or the bitstream 255; 355, respectively.

In the encoder/decoder system of FIG. 11, the bitstream may be transmitted from the encoder 1110 to the decoder 1120, wherein the bitstream may include reset information, such as the reset information 245; 345; of FIGS. 2; 3a, respectively, and wherein the reset information may be used by the decoder 1120 for the adaptive prediction process.

Referring to the FIG. 11 embodiment, the encoder 1110 and the decoder 1120 may optionally be configured to be synchronized by using a synchronization control signal 1135 provided by a synchronization controller 1130. In particular, the encoder 1110 and the decoder 1120 of the encoder/decoder system 1100 can be synchronized by the synchronization control signal 1135, so that the weighting values for the adaptive prediction are reset at synchronous times. Therefore, the predictors of the encoder 1110 and the decoder 1120 can be set to perform the resets synchronously.

It is pointed out here that in principle, it is to be distinguished between two alternatives for the determination of the reset times in the encoder and decoder. In a first alternative, the reset times can be determined by a signal analysis in the encoder and the reset information can be transmitted to the decoder. In a second alternative, the reset times can be determined by a signal analysis in the encoder and in parallel, the (identical) reset times can be determined by a signal analysis in the decoder, independently of the encoder.

According to the first alternative, the signal analysis in the encoder may be performed on the basis of the input signal s(n), since the parameters for fixing or determining the reset times (e.g., parameters describing tonality, transient behavior, discontinuity etc.) can be determined with a higher reliability from the input signal s(n).

According to the second alternative, it may be necessitated to perform the signal analysis for the determination of the reset times in the encoder as well as in the decoder on the basis of the error signal $\delta(n)$, so as to ensure the recovery of the synchronization of the reset times in case of possible transmission errors on the decoder side.

Here, it is to be noted that for the determination of the reset times, probably and at least partially some other analysis parameters can or have to be used which are different from those in the first alternative, since the error signal $\delta(n)$, which is now used for the determination of the reset times, may have different signal characteristics as compared to the input signal s(n), which is used for the determination of the reset times in the first alternative. However, both signals can be similar to each other. In some embodiments, tonality values or tonality parameters can be derived from the error signal $\delta(n)$.

In some further embodiments, there are better solutions than deriving tonality parameters from the error signal $\delta(n)$. In particular, a measure of a coding gain can first be determined from the error or residual signal $\delta(n)$. Then, the resets of the weighting values can selectively be performed in dependence on the measure of the coding gain. Here, the coding gain is due to a prediction analysis such as performed by the encoder 360 of FIG. 3b. In case the coding gain of the prediction is relatively large (or the residual signal is relatively small), a reset of the weighting values will have a strong effect on the coding gain thus resulting in a reduction thereof, thereby leading to clearly perceivable distortions of the audio quality. This negative effect on the audio quality would even be more pronounced in case of an abrupt reset. Here, the relatively large coding gain or the relatively small residual signal means that the prediction coefficients or weighting values are adapted to the signal very well. In case the coding gain of the prediction is relatively small (or the residual signal is relatively large), a reset of the weighting values will not have a significant effect on the coding gain thus resulting in a negligible reduction thereof, thereby leading to nearly inaudible or less perceivable distortions of the audio quality due to the reset. Therefore, in order to prevent the just-mentioned negative effect on the audio quality, the resets of the weighting values should selectively be performed at times for which the coding gain is relatively small such as when falling below a certain threshold or the residual signal is relatively large such as when exceeding a certain threshold, respectively.

It is also pointed out here that in any case or at least in some cases, the determination of the reset times has to be performed synchronously in the encoder and decoder. In case the determination of the reset times were performed on the basis of the reconstructed signal, in the decoder, the reset time would only be correctly analyzed and performed, if no errors were generated during the transmission of the bitstream. Here, it is to be noted that only in case of an error-free transmission, the residual signal and the predicted signal (FIG. 9) in the decoder will be identical to the input signal and the residual signal in the encoder. This means that in case of an analysis on the basis of the reconstructed signal, wrong reset times would be determined in the decoder, if errors occurred during the transmission of the bitstream. Because of the backward-adaptive property of the reset time determination, the synchronization could also not be recovered. Consequently, all subsequent resets would also occur at the wrong time, because the transmitting error and therefore the wrong reconstruction due to the asynchronous resets would not disappear.

Thus, in some embodiments, the analysis of the reset times should only be performed on the basis of the residual signals and not on the basis of the input signals (in the encoder) and the reconstructed signal (in the decoder).

According to embodiments, the signal transmitted from the encoder 1110 to the decoder 1120 in the embodiment of FIG. 11 may be a predictively encoded information signal, comprising a prediction error information signal representing differences between actual signal values s(n) and predicted signal values s'(n). Here, the predicted signal values s'(n) can be predicted in accordance with one or more weighting values $\omega_i$, while the weighting values may be adapted to the signal between subsequent resets. The predictively encoded information signal may also comprise a reset information describing times for which the weighting values can be reset.

According to further embodiments, the reset information of the predictively encoded information signal may specifically describe irregular times.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

The described embodiments are merely illustrative for the principles of the present invention. It is understood that modifications and variations of the arrangements and the details described herein will be apparent to others skilled in the art. It is the intent, therefore, to be limited only by the scope of the appending patent claims and not by the specific details presented by way of description and explanation of the embodiments herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded information signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Embodiments of the present invention provide a concept for predictively coding a signal by predicting a current value of the signal using a weighting of the values of a past signal, wherein the weighting values can continuously be adapted to the signal, and wherein the weighting values can be synchronized (for example by performing a reset to a default value) within a transmitter and a receiver at times which are adapted to the signal.

Embodiments of the present invention also provide a concept for predictive signal coding, wherein the times at which the just-mentioned synchronization can occur may be chosen in dependence on the signal, such as at times for which a reserve of bitrate is detected or for which a step, a non-tonal or a non-stationary event or temporal portion is detected within the signal.

In summary, embodiments according to the present invention apply a predictive coding scheme with variable reset times, wherein the weighting values for an adaptive prediction can continuously be adapted to the signal, so that a difference between the predicted signal and an actual signal will be minimized. Here, the adaption of the weighting values within a transmitter can be performed on the basis of a prediction error. In this way, the weighting values can be adapted to the signal.

In other words, embodiments according to the present invention are based on an adaptive reset time that can be used for predictor-based codecs.

An advantage of the present invention is that by using irregular time intervals for the resets of the weighting values, an increase in the prediction error, which would be due to a non-ideal adaption of the weighting values to the signal, can efficiently be prevented or reduced. Moreover, the present invention is advantageous because the prediction error can be represented more precisely. In particular, it is avoided that a reset may, for example, be performed at a time for which the signal is very tonal or stationary (e.g. in case of a tone of an organ pipe), so that perceivable click-like artifacts that would be caused by such a reset can efficiently be suppressed.

As opposed to state-of-the-art structures, wherein the reset is essentially performed at predetermined or fixed time intervals, which may lead to a reduction of the prediction reliability, embodiments of the present invention can avoid this disadvantage.

To recap, in order to reduce or prevent the preceivability of the resets, the resets can be performed at times, which are adapted to the signal. The resets are then less or no longer perceivable. These times are located in regions, where the coder detects a reserve of bitrate or where the signal is, e.g., non-tonal or non-stationary. The present invention is based on aperiodic times for the resets and the usage of other parameters for the determination of times at which the resets are becoming non-perceivable. The present invention is advantageous, because click-like noises that are due to resets can be prevented. In particular, it can be avoided that the prediction performance will reduce or degrade due to a reset, which would be the case if the weighting values of the predictors were not ideally adapted to the signal. The present invention does not make a reset unnecessary, but allows to perform the resets at times at which resulting distortions/interferences are not or at least less perceivable.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An encoder for predictively encoding a signal comprising a sequence of signal values, the encoder comprising:
   a predictor for performing an adaptive prediction in dependence on the signal, and in dependence on one or more weighting values, to acquire predicted signal values,
   wherein the predictor is configured to reset the weighting values at times which are dependent on the signal, and
   wherein the predictor is configured to adapt the weighting values to the signal between subsequent resets;
   wherein the encoder is configured for acquiring a bitstream representing the signal, and wherein the predictor is configured to perform the resets in dependence on a current bitrate reserve available for providing the bitstream.

2. The encoder according to claim 1, wherein the predictor is configured to perform the resets of the weighting values at times which are adapted to the signal, and wherein the encoder is configured to selectively choose the reset times for resetting the weighting values such that a perceivability of distortions caused by the resets at the chosen reset times is smaller than the perceivability of distortions which would be caused by resetting the weighting values at different times.

3. The encoder according to claim 1, wherein the encoder is configured to generate a residual signal based on differences between the signal values and the predicted signal values, so that the bitstream comprises encoded residual signal values, encoded with a variable bitrate, and wherein the predictor is configured to perform the resets of the weighting values at variable times, such that the resets are performed at times at which there is a bitrate reserve which is larger than or equal to a predetermined bitrate reserve level.

4. The encoder according to claim 1, wherein the encoder is configured to perform a signal analysis of the signal and to selectively perform the resets in dependence on the signal analysis of the signal, and wherein the encoder is configured for acquiring a bitstream representing the signal and for providing a reset information encoded within the bitstream in dependence on the signal analysis.

5. The encoder according to claim 1, wherein the encoder is configured to determine a tonality parameter from the signal values and to selectively perform the resets at times for which the signal is non-tonal in dependence on the determination of the tonality.

6. The encoder according to claim 1, wherein the encoder is configured to determine a transient behavior from the signal values and to perform the resets at times for which the signal is non-stationary.

7. The encoder according to claim 1, wherein the encoder is configured to determine a discontinuity behavior from the signal values and to perform the resets at times for which the signal comprises a step.

8. The encoder according to claim 1, wherein the encoder is configured to perform a residual signal analysis of a residual signal, the residual signal being based on differences between the signal values and the predicted signal values, and to selectively perform the resets in dependence on the residual signal analysis of the residual signal, and wherein the encoder is configured for acquiring a bitstream representing the signal and comprising a sequence of encoded residual signal values, wherein the encoder is configured to avoid an inclusion of a reset flag indicating a reset of the weighting values into the bitstream.

9. The encoder according to claim 8, wherein the encoder is configured to determine a measure of a coding gain from the residual signal and to selectively perform the resets in dependence on the measure of the coding gain.

10. The encoder according to claim 1, wherein the predictor is configured to perform the resets at irregular times, which are dependent on the signal.

11. The encoder according to claim 1, wherein the predictor is configured to perform the adaption of the weighting values based on a prediction error.

12. A decoder for decoding a predictively encoded signal comprising a sequence of residual signal values encoded within a bitstream, the decoder comprising:
    a bitstream parser configured for acquiring the residual signal values from the bitstream;
    a reset time determinator configured to determine reset times in dependence on the residual signal values; and
    a predictor which is configured to perform an adaptive prediction to acquire predicted signal values and to add the predicted signal values and the residual signal values to acquire decoded signal values,
    wherein the predictor is configured to reset one or more weighting values for the adaptive prediction at the determined reset times, and
    wherein the predictor is configured to adapt the weighting values to the signal to be decoded between subsequent resets.

13. A decoder for decoding a predictively encoded signal comprising a sequence of residual signal values encoded within a bitstream, the decoder comprising:
    a bitstream parser configured for acquiring the residual signal values from the bitstream;
    a reset time determinator configured to determine reset times in dependence on a current bitrate reserve of a bitstream representing the predictively encoded signal; and
    a predictor which is configured to perform an adaptive prediction to acquire predicted signal values and to add the predicted signal values and the residual signal values to acquire decoded signal values,
    wherein the predictor is configured to reset one or more weighting values for the adaptive prediction at the determined reset times, and
    wherein the predictor is configured to adapt the weighting values to the signal to be decoded between subsequent resets.

14. A system for predictively encoding a signal comprising a sequence of signal values and for decoding a predictively encoded version of the signal comprising a sequence of residual signal values, the system comprising:
    an encoder for predictively encoding a signal comprising a sequence of signal values, the encoder comprising:
        a predictor for performing an adaptive prediction in dependence on the signal, and in dependence on one or more weighting values, to acquire predicted signal values,
        wherein the predictor is configured to reset the weighting values at times which are dependent on the signal, and
        wherein the predictor is configured to adapt the weighting values to the signal between subsequent resets;
        wherein the encoder is configured for acquiring a bitstream representing the signal, and wherein the predictor is configured to perform the resets in dependence on a current bitrate reserve available for providing the bitstream; and
    a decoder for decoding according to one of claims 12 to 13;
    wherein the predictors of the encoder and the decoder are configured to perform the resets synchronously.

15. A method for predictively encoding a signal comprising a sequence of signal values, the method comprising:
    performing an adaptive prediction in dependence on the signal, and in dependence on one or more weighting values, to acquire predicted signal values,
    wherein performing an adaptive prediction comprises resetting the weighting values at times which are dependent on the signal, and adapting the weighting values to the signal between subsequent resets;
    wherein the method comprises acquiring a bitstream representing the signal, and
    wherein the resets are performed in dependence on a current bitrate reserve available for providing the bitstream.

16. A method for decoding a predictively encoded signal comprising a sequence of residual signal values encoded within a bitstream, the method comprising:
    acquiring the residual signal values from the bitstream;
    determining reset time in dependence on the residual signal values;
    performing an adaptive prediction to acquire predicted signal values and adding the predicted signal values and the residual signal values to acquire decoded signal values,
    wherein performing an adaptive prediction and adding comprise resetting one or more weighting values for the adaptive prediction at the determined reset times, and adapting the weighting values to the signal to be decoded between subsequent resets.

17. A method for decoding a predictively encoded signal comprising a sequence of residual signal values encoded within a bitstream, the method comprising:
    acquiring the residual signal values from the bitstream;
    determining reset times in dependence on a current bitrate reserve of a bitstream representing the predictively encoded signal; and
    performing an adaptive prediction to acquire predicted signal values and adding the predicted signal values and the residual signal values to acquire decoded signal values,
    wherein performing an adaptive prediction and adding comprise resetting one or more weighting values for the adaptive prediction at the determined reset times, and adapting the weighting values to the signal to be decoded between subsequent resets.

18. A method for predictively encoding a signal comprising a sequence of signal values and for decoding a predictively encoded version of the signal comprising a sequence of residual signal values, the method comprising:
    a method for predictively encoding a signal comprising a sequence of signal values, the method comprising:

performing an adaptive prediction in dependence on the signal, and in dependence on one or more weighting values, to acquire predicted signal values, wherein performing an adaptive prediction comprises resetting the weighting values at times which are dependent on the signal, and adapting the weighting values to the signal between subsequent resets;

wherein the method comprises acquiring a bitstream representing the signal, and wherein the resets are performed in dependence on a current bitrate reserve available for providing the bitstream;

a method for decoding according to one of claims 16 to 17;

wherein in resetting the one or more weighting values, the resets are performed synchronously.

19. An encoder for predictively encoding a signal comprising a sequence of signal values, the encoder comprising:

a predictor for performing an adaptive prediction in dependence on the signal, and in dependence on one or more weighting values, to acquire predicted signal values, wherein the predictor is configured to reset the weighting values at times which are dependent on the signal, and wherein the predictor is configured to adapt the weighting values to the signal between subsequent resets;

wherein the encoder is configured to determine a tonality parameter from the signal values and to selectively perform the resets at times for which the signal is non-tonal in dependence on the determination of the tonality.

20. An encoder for predictively encoding a signal comprising a sequence of signal values, the encoder comprising:

a predictor for performing an adaptive prediction in dependence on the signal, and in dependence on one or more weighting values, to acquire predicted signal values, wherein the predictor is configured to reset the weighting values at times which are dependent on the signal, and wherein the predictor is configured to adapt the weighting values to the signal between subsequent resets;

wherein the encoder is configured to perform a residual signal analysis of a residual signal, the residual signal being based on differences between the signal values and the predicted signal values, and to selectively perform the resets in dependence on the residual signal analysis of the residual signal, and wherein the encoder is configured for acquiring a bitstream representing the signal and comprising a sequence of encoded residual signal values, wherein the encoder is configured to avoid an inclusion of a reset flag indicating a reset of the weighting values into the bitstream.

21. The encoder according to claim 19, wherein the encoder is configured to determine a measure of a coding gain from the residual signal and to selectively perform the resets in dependence on the measure of the coding gain.

22. A method for predictively encoding a signal comprising a sequence of signal values, the method comprising:

performing an adaptive prediction in dependence on the signal, and in dependence on one or more weighting values, to acquire predicted signal values, wherein performing an adaptive prediction comprises resetting the weighting values at times which are dependent on the signal, and adapting the weighting values to the signal between subsequent resets;

wherein the method comprises determining a tonality parameter from the signal values and wherein the resets are selectively performed at times for which the signal is non-tonal in dependence on the determination of the tonality.

23. A method for predictively encoding a signal comprising a sequence of signal values, the method comprising:

performing an adaptive prediction in dependence on the signal, and in dependence on one or more weighting values, to acquire predicted signal values, wherein performing an adaptive prediction comprises resetting the weighting values at times which are dependent on the signal, and adapting the weighting values to the signal between subsequent resets;

wherein the method comprises performing a residual signal analysis of a residual signal, the residual signal being based on differences between the signal values and the predicted signal values, and wherein the resets are selectively performed in dependence on the residual signal analysis of the residual signal, and a bitstream representing the signal and comprising a sequence of encoded residual signal values is acquired, wherein an inclusion of a reset flag indicating a reset of the weighting values into the bitstream is avoided.

24. A non-transitory computer readable medium including a computer program comprising a program code for performing the method for predictively encoding according to claim 15, when the computer program is executed on a computer.

25. A non-transitory computer readable medium including a computer program comprising a program code for performing the method for predictively encoding according to claim 22, when the computer program is executed on a computer.

26. A non-transitory computer readable medium including a computer program comprising a program code for performing the method for predictively encoding according to claim 23, when the computer program is executed on a computer.

27. A non-transitory computer readable medium including a computer program comprising a program code for performing the method for decoding according claim 16, when the computer program is executed on a computer.

28. A non-transitory computer readable medium including a computer program comprising a program code for performing the method for decoding according to claim 17, when the computer program is executed on a computer.

29. A non-transitory computer readable medium including a computer program comprising a program code for performing the method for predictively encoding and decoding according to claim 18, when the computer program is executed on a computer.

* * * * *